(12) United States Patent
Whitt et al.

(10) Patent No.: US 11,807,131 B2
(45) Date of Patent: *Nov. 7, 2023

(54) SYSTEMS AND METHODS FOR TRANSPORT COMPLETION USING LANE-CONSTRAINED VEHICLES AND PERSONAL MOBILITY VEHICLES

(71) Applicant: Lyft, Inc., San Francisco, CA (US)

(72) Inventors: Carlos Ellis Whitt, San Francisco, CA (US); Steven James Martisauskas, San Francisco, CA (US); Dor Levi, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/698,691

(22) Filed: Mar. 18, 2022

(65) Prior Publication Data

US 2022/0234468 A1 Jul. 28, 2022

Related U.S. Application Data

(63) Continuation of application No. 16/206,999, filed on Nov. 30, 2018, now Pat. No. 11,279,256.
(Continued)

(51) Int. Cl.
*B60L 58/13* (2019.01)
*G07C 5/00* (2006.01)
(Continued)

(52) U.S. Cl.
CPC .............. *B60L 58/13* (2019.02); *B60Q 1/346* (2013.01); *B60Q 1/444* (2013.01); *B60R 25/245* (2013.01);
(Continued)

(58) Field of Classification Search
CPC ......... B60L 58/13; B60Q 1/346; B60Q 1/444; G01C 21/3423; G01C 21/3415;
(Continued)

(56) References Cited

U.S. PATENT DOCUMENTS

2016/0231129 A1* 8/2016 Erez .................. G01C 21/3423
2016/0320198 A1* 11/2016 Liu ..................... G01C 21/3438
(Continued)

*Primary Examiner* — Muhammad Shafi
(74) *Attorney, Agent, or Firm* — Baker Botts L.L.P.

(57) ABSTRACT

Personal mobility vehicles, their various components, methods and systems for controlling, using, tracking, and/or interacting with personal mobility vehicles, and methods and systems for integrating personal mobility vehicles within dynamic transportation networks so that a personal mobility vehicle (PMV) can be used in combination with a vehicle of a transportation provider to efficiently complete a transportation request are discussed. For example, a PMV may be used in combination with a lane-constrained vehicle to improve travel time between two locations in situations where the time it may take for a lane-constrained vehicle to reach the starting location may be affected by traffic congestion at the starting location. The PMV may transport a transportation requestor from a starting location to an intermediate location away from the traffic congestion to then transfer to a lane-constrained vehicle for the remainder of the trip.

20 Claims, 15 Drawing Sheets

Related U.S. Application Data

(60) Provisional application No. 62/681,661, filed on Jun. 6, 2018.

(51) Int. Cl.

| | | |
|---|---|---|
| *G06Q 10/02* | (2012.01) | |
| *G06Q 50/30* | (2012.01) | |
| *B60Q 1/34* | (2006.01) | |
| *B60Q 1/44* | (2006.01) | |
| *G01C 21/34* | (2006.01) | |
| *B60W 10/08* | (2006.01) | |
| *B60W 10/18* | (2012.01) | |
| *B60W 10/20* | (2006.01) | |
| *B60W 10/30* | (2006.01) | |
| *B60W 50/12* | (2012.01) | |
| *G08G 1/16* | (2006.01) | |
| *G08G 1/01* | (2006.01) | |
| *G01C 21/20* | (2006.01) | |
| *H04W 4/029* | (2018.01) | |
| *G06V 20/56* | (2022.01) | |
| *G07C 5/08* | (2006.01) | |
| *G07C 9/25* | (2020.01) | |
| *H04W 4/40* | (2018.01) | |
| *B60R 25/24* | (2013.01) | |

(52) U.S. Cl.
CPC ............ *B60W 10/08* (2013.01); *B60W 10/18* (2013.01); *B60W 10/20* (2013.01); *B60W 10/30* (2013.01); *B60W 50/12* (2013.01); *G01C 21/20* (2013.01); *G01C 21/3415* (2013.01); *G01C 21/3423* (2013.01); *G01C 21/3438* (2013.01); *G01C 21/3461* (2013.01); *G01C 21/3492* (2013.01); *G06Q 10/02* (2013.01); *G06Q 50/30* (2013.01); *G06V 20/588* (2022.01); *G07C 5/004* (2013.01); *G07C 5/008* (2013.01); *G07C 5/0808* (2013.01); *G07C 9/25* (2020.01); *G08G 1/0125* (2013.01); *G08G 1/163* (2013.01); *G08G 1/165* (2013.01); *H04W 4/029* (2018.02); *H04W 4/40* (2018.02); *B60R 2325/205* (2013.01); *B60W 2300/365* (2013.01); *B60W 2510/244* (2013.01); *B60W 2552/00* (2020.02); *B60W 2552/15* (2020.02); *B60W 2710/086* (2013.01); *B60W 2710/18* (2013.01); *B60W 2710/20* (2013.01); *B60W 2710/30* (2013.01); *B60W 2720/10* (2013.01); *B62K 2202/00* (2013.01)

(58) Field of Classification Search
CPC ............ G01C 21/3461; G01C 21/3438; G01C 21/3492; G01C 21/20; G06K 9/00798; G06K 9/00791; B60W 10/08; B60W 10/18; B60W 10/20; B60W 10/30; B60W 50/12; B60W 2552/00; B60W 2552/15; B60W 2300/365; B60W 2510/244; B60W 2710/086; B60W 2710/18; B60W 2710/20; B60W 2710/30; B60W 2720/10; G08G 1/163; G08G 1/165; G08G 1/0125; G08G 1/205; G08G 1/0141; H04W 4/029; H04W 4/40; B60R 25/245; B60R 2325/205; G07C 5/004; G07C 5/008; G06Q 10/02; G06Q 50/30; B62K 2202/00; Y02T 10/70
USPC ........................................................ 701/414
See application file for complete search history.

(56) References Cited

U.S. PATENT DOCUMENTS

2017/0364995 A1* 12/2017 Yan .................... G06Q 30/0645
2018/0094943 A1* 4/2018 Grochocki, Jr. ... G01C 21/3492

* cited by examiner

SYSTEMS AND METHODS FOR TRANSPORT COMPLETION USING LANE-CONSTRAINED VEHICLES AND PERSONAL MOBILITY VEHICLES

CROSS REFERENCE TO RELATED APPLICATION

This application is a continuation under 35 U.S.C. § 120 of U.S. patent application Ser. No. 16/206,999, filed on Nov. 30 2018, which claims priority under 35 U.S.C. § 119(e)(1) to U.S. Provisional Application No. 62/681,661, filed on Jun. 6 2018, the entire disclosures of both applications are incorporated herein by reference in their entireties.

BACKGROUND

Some transportation services may provide transportation on demand, helping those requesting transportation to connect with those who are willing to provide transportation as the needs arise. These transportation services may facilitate agreements and/or communication between those requesting and those providing transportation. At times, however, travel conditions can adversely affect an arrangement for transportation by adding additional travel time or other delays to the arrival of the requested transportation at a pickup location.

SUMMARY

As will be described in greater detail below, the instant disclosure describes systems and methods for combining the use of personal mobility vehicles with the use of a vehicle of a transportation provider that may be restricted to road travel in order to efficiently complete a transportation request.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
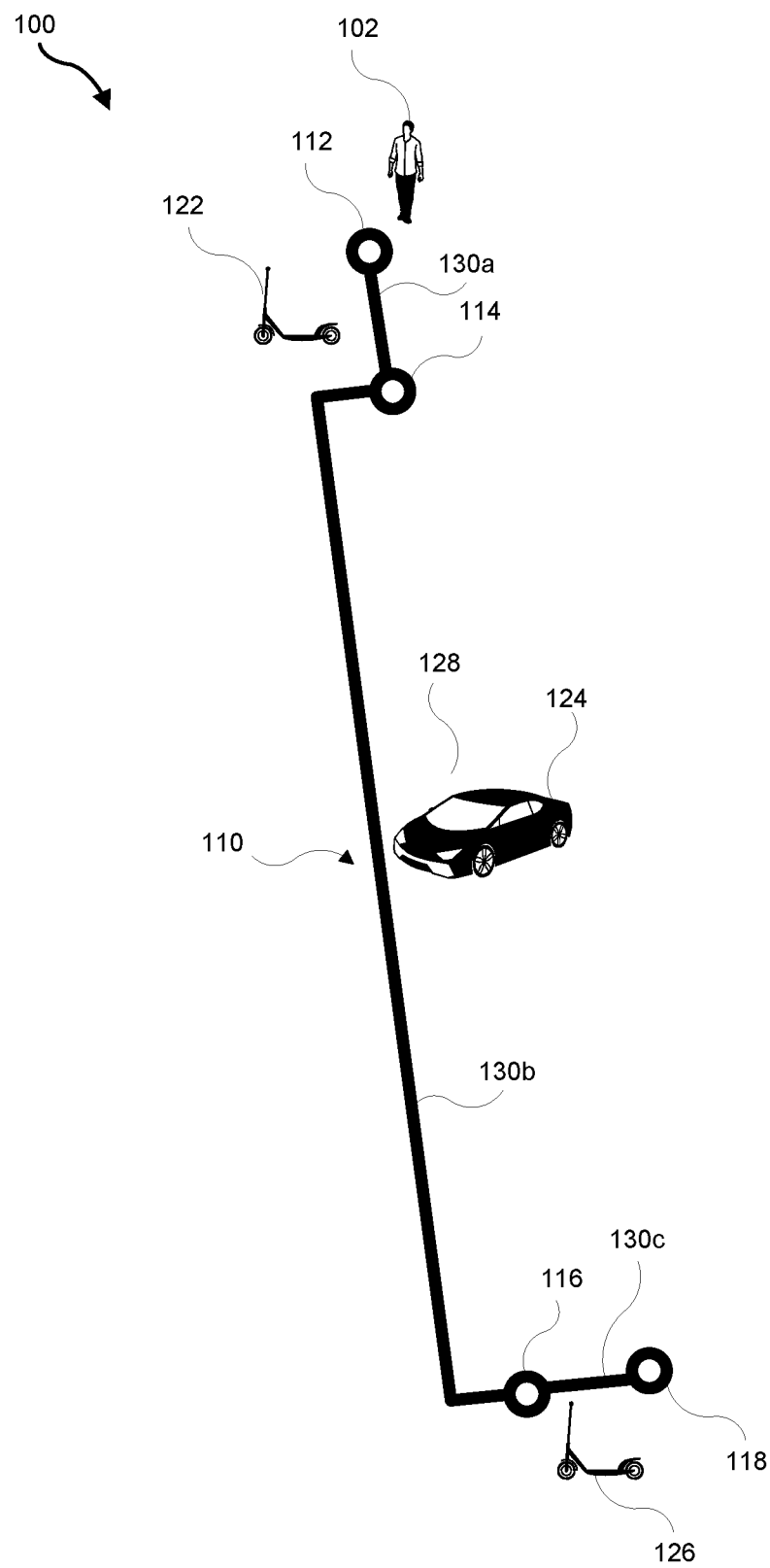
FIG. 1 is an illustration of an example trip using one or more personal mobility vehicles along with a lane-constrained vehicle of a provider.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to personal mobility vehicles, their various components, methods and systems for controlling, using, tracking, and/or interacting with personal mobility vehicles, and methods and systems for integrating personal mobility vehicles within dynamic transportation networks so that a personal mobility vehicle (PMV) can be used in combination with a vehicle of a transportation provider (also referred to herein as a provider) to efficiently complete a transportation request.

In some implementations, a personal mobility vehicle may be used in combination with a lane-constrained vehicle of a provider in order to improve travel time between two locations. The lane-constrained vehicle may be a vehicle (e.g., an automobile, bus, truck, van, motor home, motorcycle, etc.) designed to transport a driver and one or more passengers or cargo on roads and highways. For example, in situations where a transportation requestor (also referred to herein as a requestor) requests transportation from a starting location, the time it may take for a lane-constrained vehicle to reach the transportation requestor at the starting location may be affected by a lane-constrained vehicle traffic bottleneck at the starting location. A personal mobility vehicle can transport the transportation requestor from the starting location to an intermediate location away from the traffic bottleneck. A personal mobility vehicle may travel on roads traveled by the lane-constrained vehicle. A personal mobility vehicle, however, may also travel on sidewalks, roads, and other pathways (e.g., bike paths, bike lanes, etc.) that a lane-constrained vehicle may not travel. The intermediate location may be determined based on one or more factors that can include but are not limited to, distance from the starting location, the road conditions between the starting location and the intermediate location (e.g., easily traveled by a personal mobility vehicle), ease of rendezvousing with a lane-constrained vehicle of a provider, etc.

A lane-constrained vehicle of the provider can meet the transportation requestor at the intermediate location and can continue to transport the transportation requestor to a desired drop-off location. The use of the combination of the personal mobility vehicle and the lane-constrained vehicle of the provider can greatly improve the overall experience of the transportation requestor. Not only does the lane-constrained vehicle of the provider not have to travel through the traffic bottleneck to meet the transportation requestor but the lane-constrained vehicle of the provider also does not have to travel away from (out of) the traffic bottleneck to transport the transportation requestor to the desired drop-off location.

In some implementations, for example, a drop-off or ending location for a requested transport may adversely affect the time it may take for a lane-constrained vehicle of a provider to reach the ending location after picking up the transportation requestor at a starting location. For example, a lane-constrained vehicle traffic bottleneck may be identified at the ending location. The provider may transport the transportation requestor to an intermediate location away from the ending location. A personal mobility vehicle can transport the transportation requestor from the intermediate location to the ending location, avoiding the traffic bottleneck. The use of the combination of the personal mobility vehicle and the lane-constrained vehicle of the provider can greatly improve the overall experience of the transportation requestor by having the lane-constrained vehicle of the provider avoid the lane-constrained vehicle traffic bottleneck at the ending location.

Use of a personal mobility vehicle for part or all of a requested transport may keep at least a portion of the lane-constrained vehicles out of the lane-constrained vehicle congestion surrounding either a drop-off location or a pick-up location saving time for the transportation provider to reach the location as well as saving time for the transportation provider to leave the location.

In some implementations, the use of a personal mobility vehicle to complete a transportation request and/or to transport a transportation requestor from a starting location to an ending location can be based on a reduced fee or discount for the cost of the transport. For example, the personal mobility vehicle may transport the transportation requestor to a central docking location for the personal mobility vehicle. In some implementations, a transportation requestor may use of a personal mobility vehicle for transport to or from a shared ride location.

As will be explained in greater detail below, a dynamic transportation matching system may arrange transportation on an on-demand and/or ad-hoc basis by, e.g., matching one or more transportation requestors with one or more transportation providers. For example, a dynamic transportation matching system may match a transportation requestor (also referred to herein as a requestor) to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally, or alternatively, sources of transportation within a dynamic transportation network may include vehicles that are owned outside of the dynamic transportation network but that participate within the dynamic transportation network by agreement. In some examples, the dynamic transportation network may include lane-constrained vehicles (e.g., cars, light trucks, etc.). Furthermore, in some examples, as will be explained in greater detail below, the dynamic transportation network may include personal mobility vehicles.

As used herein, the term "personal mobility vehicle" (or "PMV") may refer to any of a variety of types of vehicles that may be smaller and/or lighter than traditional lane-constrained vehicles. In some examples, a personal mobility vehicle may have fewer than four wheels. In some examples, personal mobility vehicles may be more flexible, maneuverable, and may be provided access to particular portions of a roadway (e.g., bike lane, sidewalk, etc.) that traditional lane-constrained vehicles (e.g., automobiles) may not legally be able to access. Personal mobility vehicles may be human and/or motor powered and may have any suitable sized and/or powered motor to allow the personal mobility vehicle to travel any suitable speed and carry any suitable load. In some embodiments, without limitation, a personal mobility vehicle may operate with less than about five horsepower, less than about four horsepower, or less than about three horsepower. Notwithstanding the above examples, PMVs may operate at any suitable horsepower level (e.g., significantly higher horsepower levels). In various examples, without limitation, a personal mobility vehicle may weigh less than about 150 pounds, less than about 100 pounds, less than about 70 pounds, or less than about 50 pounds. Notwithstanding the above examples, PMVs may have any suitable weight.

In various examples, without limitation, a personal mobility vehicle may operate at a maximum speed (e.g., absent downhill acceleration) of about 35 miles per hour or less, about 30 miles per hour or less, about 25 miles per hour or less, or about 20 miles per hour or less. Notwithstanding the above examples, PMVs may operate at any suitable speed (including, e.g., significantly higher speeds). In some examples, a personal mobility vehicle may be designed to transport a single passenger. However, in some embodiments, personal mobility vehicles may also transport more than a single passenger (e.g., a tandem bicycle). In some examples, a personal mobility vehicle may be partially or fully self-powered (e.g., through a combustion motor or an electric motor). In some examples, a personal mobility vehicle may be partially or fully human-powered. Examples of personal mobility vehicles include, without limitation, scooters, pedaled bicycles, and electric bicycles.

In some implementations, a personal mobility vehicle may be used in combination with a vehicle of a transportation provider to efficiently complete a transportation request and/or to provide improved (e.g., reduced) travel time for a trip. A dynamic transportation matching system may receive a request for transportation from a pickup location from a transportation requestor. For example, in some cases, the personal mobility vehicle may provide the transportation for a part of a trip. In some cases, the transportation requestor may utilize the personal mobility vehicle to travel from the pickup location to an alternate pickup location. In some cases, the transportation requestor may utilize the personal mobility vehicle to travel from an alternate drop-off location to the drop-off location. By introducing personal mobility vehicles into a lane-constrained vehicle (e.g., an automobile-based) transportation network makes it possible to alleviate network problems associated with lane-constrained vehicles through the strategic use of personal mobility vehicles.

In some implementations, the transportation matching system may incentivize use of personal mobility vehicles during times of a high number of transportation requests in a certain region as compared to a number of provider resources (e.g., primetime requests). The incentivized use may include, for example, free or reduced-fee PMV use during primetime to improve availability within the transportation network. In general, when a portion of a trip (e.g., the beginning or end of the trip) is more efficiently traveled by PMV as opposed to a provider based transport (e.g., due to traffic density, road conditions, provider distribution, shared ride opportunities, etc.), the method may match a requestor with the PMV for that portion of the trip (and, e.g., arrange a transfer between the PMV and a lane-constrained vehicle).

As will be explained in greater detail below, embodiments of the instant disclosure may include systems that include both lane-constrained vehicles and PMVs. Accordingly, systems described herein may alleviate network problems associated with cars through strategic uses of PMVs and traditional mass transit and/or private vehicles. For example, systems described herein may determine that many requestors are likely to request transportation from a single location within a relatively short time window (e.g., from an event venue following an event). Accordingly, the systems described herein may (i) arrange for PMVs to be ready for use near the venue and (ii) plan trips involving requestors riding away a short distance by PMV (e.g., to reduce request density at the location) in order to, e.g., meet a lane-constrained vehicle within the dynamic transportation network.

The methods and systems included herein improve the functioning of a computer that provides transportation to a requestor, matches a transportation request with one or more lane-constrained vehicles and/or one or more personal mobility vehicles. The computer, and specifically a dynamic transportation matching system included in the computer, may receive data regarding traffic conditions, may receive data regarding availability and/or location information for lane-constrained vehicle(s) and personal mobility vehicle(s), may receive a request for transportation from a requestor, and may use the data and the computer to match the transportation requestor with one or more lane-constrained vehicles and/or one or more personal mobility vehicles to efficiently complete the transportation request.

Embodiments of the instant disclosure provide improvements in the technical field of transportation service management by using both lane-constrained vehicles and personal mobility vehicles to complete a transportation request and/or a trip in an efficient manner by reducing the overall travel time for the requestor by utilizing one or more personal mobility vehicles to circumvent areas along a trip that may be congested with lane-constrained vehicle traffic.

In some examples, the systems and methods described herein may arrange for the end of a trip of a requestor to be completed by PMV. For example, a dynamic transportation matching system may match a requestor to a lane-constrained provider for at least a portion of a trip. However, the last stretch of the trip of the requestor may include a high-traffic-density area for lane-constrained vehicles. Accordingly, to improve the requestor's experience, reduce the requestor's trip time, improve the efficiency of the lane-constrained provider (e.g., freeing the lane-constrained provider for more efficient tasks), and/or avoid further contributing to traffic congestion (thereby, e.g., improving the efficiency of other transportation providers within the dynamic transportation network traveling in the high-traffic-density area), systems described herein may match the requestor with a PMV for a portion of the trip including the high-traffic-density area. In some examples, systems described herein may determine in advance that the trip of the requestor includes a high-traffic-density area and match the requestor with the PMV for that portion of the trip accordingly. Additionally, or alternatively, systems described herein may determine during a trip that the requestor will travel through a high-density-traffic area and may notify the requestor of an option to switch from a lane-constrained provider to a nearby PMV.

In some implementations, a dynamic transportation matching system may match a transportation requestor to a personal mobility vehicle to efficiently complete a transportation request and/or to provide improved (e.g., reduced) travel time for a trip. For example, the dynamic transportation matching system may determine that a pickup location of a transportation requestor is near an available personal mobility vehicle within the dynamic transportation network. The dynamic transportation matching system may provide directions to the personal mobility vehicle to the transportation requestor. The dynamic transportation matching system may transmit instructions to the personal mobility vehicle to unlock and/or activate the personal mobility vehicle for use by the transportation requestor to ride from the pickup location to a drop-off or destination location.

As another example, systems described herein may incentivize use of PMVs during periods of high request volume (e.g., by providing free or reduced cost PMV use during periods of high request volume in an area) to improve availability of other vehicles (e.g., lane-constrained vehicles by dispersing the high-volume request area to a larger geographic area) within the dynamic transportation network. The dynamic transportation management system may identify such situations by comparing wait times and/or ETAs for available providers at a present request location to an estimated travel time from a current position of a requestor to an alternative pickup location using an available PMV and an ETA for a provider at the alternative pickup location with less traffic, more available drivers, fewer bottlenecks in access to requestor pickup locations, etc.

FIG. 1 is an illustration of an example trip 100 using one or more personal mobility vehicles (e.g., a personal mobility vehicle 122 and a personal mobility vehicle 126) along with a lane-constrained vehicle of a provider (e.g., a lane-constrained vehicle 124 of a provider 128). As shown in FIG. 1, a requestor 102 (e.g., a person requesting transportation) may request transportation at the pickup location 112 for a trip 110 that begins at the pickup location 112 and ends at a drop-off location 118. The requestor 102 may start the trip 110 at the pickup location 112 and ride a personal mobility vehicle (e.g., a scooter 122) from the pickup location 112 to an alternate pickup location 114. In some implementations, the requestor 102 may then leave the scooter 122 at the alternate pickup location 114 and meet the provider 128 that provides the lane-constrained vehicle 124 for continuing the trip 110 by transporting the requestor 102 from the alternate pickup location 114 to an alternate drop-off location 116. In some implementations, the scooter 122 may be loaded into the lane-constrained vehicle 124 (e.g., into a trunk of the lane-constrained vehicle 124, into a back seat of the lane-constrained vehicle 124) for transport by the transportation provider 128 to another location (e.g., the alternate drop-off location 116). Once the requestor 102 arrives at the alternate drop-off location 116, the requestor 102 may then continue trip 110 from the alternate drop-off location 116 to the drop-off location 118 by riding a personal mobility vehicle (e.g., a scooter 126) from the alternate drop-off location 116 to the drop-off location 118. For example, the scooter 126 may be a scooter that was left and/or docked at the alternate drop-off location 116. In another example, the scooter 126 may be the scooter 122 that was transported in the lane-constrained vehicle 124.

In some cases, a dynamic transportation matching system may match the requestor 102 to the scooter 122 for the beginning of the trip and/or may match the requestor 102 to the scooter 126 for the end of trip 110. This matching may improve travel efficiencies for the requestor 102 and/or the provider 128. For example, the dynamic transportation matching system may determine that one or more portions of the trip 110 may be inefficient for use by the provider 128. For example, there may be high traffic density on a portion of the route for use by the provider 128 when traveling to and/or from the pickup location 112 and/or when traveling to the drop-off location 118. The high traffic density may be due to an increased number of lane-constrained vehicles on the road(s) for travel on the route (e.g., rush hour traffic). The high traffic density may be due to construction on one or more of the road(s) available for lane-constrained vehicles for travel on the route making some of the roads or portions of some of the roads unsuitable for lane-constrained vehicles. The high traffic density may be due to a traffic accident on one or more of the road(s) available for lane-constrained vehicles for travel on the route. The dynamic transportation matching system may identify the alternate pickup location 114 to improve (reduce) the overall travel time for the trip 110 that includes the time it takes to complete the travel request as well as the travel time for the trip 110. In addition, or in the alternative, the dynamic transportation matching system may identify the alternate drop-off location 116 to improve (reduce) the overall travel time for the trip 110 that includes the time it takes to complete the travel request as well as the travel time for the trip 110.

In some implementations, the dynamic transportation matching system may match the requestor 102 to the scooter 122 for travel from the pickup location 112 to the alternate pickup location 114 for subsequent transfer to the lane-constrained vehicle 124 for transport to the drop-off location 118. In some implementations, the dynamic transportation matching system may match the requestor 102 to the scooter 126 for travel from the alternate drop-off location 116 to the drop-off location 118. The lane-constrained vehicle 124 of the provider 128 may pick up the requestor 102 at the pickup location 112 and then travel to the alternate drop-off location 116 where the requestor 102 completes the trip 110 to the drop-off location 118 using the scooter 126. In some implementations, the dynamic transportation matching system may match the requestor 102 to the scooter 122 for travel from the pickup location 112 to the alternate pickup location 114 and may match the requestor 102 to the scooter 126 for travel from the alternate drop-off location 116 to the drop-off location 118. The requestor 102 using the scooter 122 travels from the pickup location 112 to the alternate pickup location 114 for subsequent transfer to the lane-constrained vehicle 124 for transport to the alternate drop-off location 116 where the requestor 102 completes the trip to the drop-off location 118 using the scooter 126.

Additionally, or alternatively, the lane-constrained vehicle 124 of the provider 128 may provide transportation to one or more requestors in addition to the requestor 102 for the portion of the trip 110 from the alternate pickup location 114 to the alternate drop-off location 116 (e.g., leg 130b). The dynamic transportation matching system may determine that directing the requestor 102 to arrive at the alternate pickup location 114 using the scooter 122 reduces the travel time for the additional requestors. For example, the dynamic transportation matching system may arrange the trip 110 as a multi-leg trip 130a-c at the time of the transportation request by the requestor 102. For example, in some cases, the dynamic transportation matching system may dynamically change the trip while the requestor 102 is en route to the drop-off location 118. For example, the dynamic transportation matching system may initially direct the provider 128 to transport the requestor 102 from the alternate pickup location 114 directly to the drop-off location 118. The dynamic transportation matching system, however, may later determine it would be more efficient for the requestor 102, the provider 128, and/or one or more additional requestors (if the transport is shared) to be dropped off at the alternative drop-off location 116 for travel by scooter 126 to the drop-off location 118. For example, the dynamic transportation matching system may determine that route for travel from the alternate drop-off location 116 to the drop-off location 118 is congested. The dynamic transportation matching system may determine that the requestor 102 and/or the provider 128 would save time and/or expense by matching the requestor 102 to the scooter 126 at the alternate drop-off location 116. Accordingly, the dynamic transportation matching system may notify the requestor 102 and/or the provider 128 during the trip 110 to arrange for the modification to trip 110.

Figure 2:
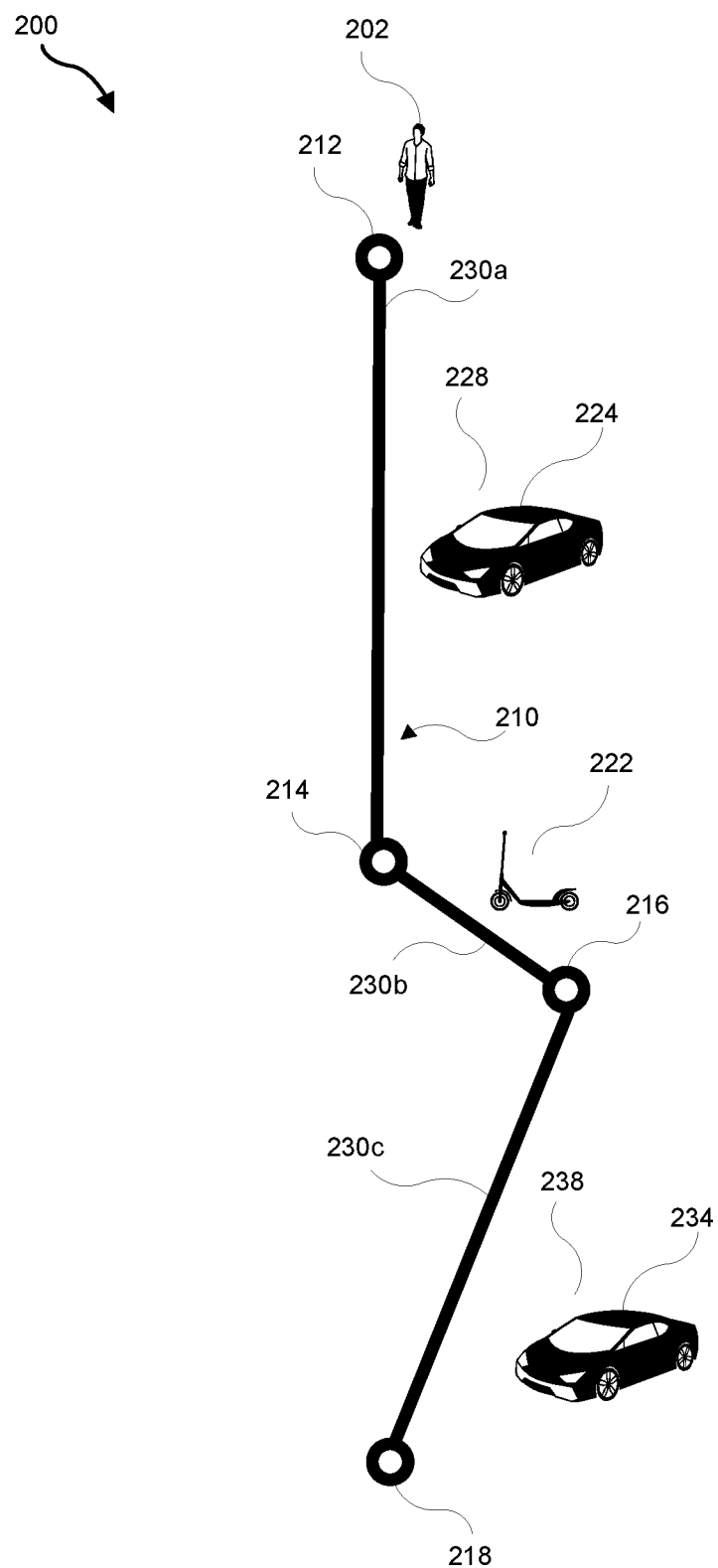
FIG. 2 is an illustration of an example trip using a personal mobility vehicle along with one or more lane-constrained vehicles.

FIG. 2 is an illustration of an example trip 200 using a personal mobility vehicle 222 along with one or more lane-constrained vehicles (e.g., a lane-constrained vehicle 224 of a provider 228 and a lane-constrained vehicle 234 of a provider 238). As shown in FIG. 2, a requestor 202 (e.g., a person requesting transportation) may request transportation at the pickup location 212 for a trip 210 that begins at the pickup location 212 and ends at a drop-off location 218. The lane-constrained vehicle 224 of the provider 228 may transport the requestor 202 from the pickup location 212 to an alternate location 214. The requestor 202 may ride a personal mobility vehicle (e.g., a scooter 222) from the alternate location 214 to another alternate location 216. For example, the scooter 222 may be a scooter that was left and/or docked at the alternate location 214. In another example, the scooter 222 may be transported in the lane-constrained vehicle 224.

In some implementations, the requestor 202 may then leave the scooter 222 at the alternate location 216 and meet the provider 238 that provides the lane-constrained vehicle 234 for continuing the trip 210 by transporting the requestor 202 from the alternate location 216 to the drop-off location 218. In some implementations, the scooter 222 may be loaded into the lane-constrained vehicle 234 (e.g., into a trunk of the lane-constrained vehicle 234, into a back seat of the lane-constrained vehicle 234) for transport by the transportation provider 238 to another location (e.g., the drop-off location 218).

In some cases, a dynamic transportation matching system may match the requestor 202 to the scooter 222 for leg 230b of the trip 210. This matching may improve travel efficiencies for the requestor 202 and/or the provider 228 and/or the provider 238. For example, the dynamic transportation matching system may determine that one or more portions of the trip 210 may be inefficient for use by a lane-constrained vehicle. For example, there may be high traffic density on a portion of the route for use by a lane-constrained vehicle when traveling between the pickup location 212 and the drop-off location 218. The high traffic density may be due to an increased number of lane-constrained vehicles on the road(s) for travel on the route (e.g., rush hour traffic). The high traffic density may be due to construction on one or more of the road(s) available for lane-constrained vehicles for travel on the route making some of the roads or portions of some of the roads unsuitable for lane-constrained vehicles. The high traffic density may be due to a traffic accident on one or more of the road(s) available for lane-constrained vehicles for travel on the route. The dynamic transportation matching system may identify the alternate location 214 and the alternate location 216 to improve (reduce) the overall travel time for the trip 210.

In some implementations, the dynamic transportation matching system may match the requestor 202 to the scooter 222 for travel from the alternate location 214 to the alternate location 216 for subsequent transfer to the lane-constrained vehicle 234 for transport to the drop-off location 218. In some implementations, the dynamic transportation matching system may match the requestor 202 to the lane-constrained vehicle 224 of the provider 228 based on the scooter 222 being loaded into the lane-constrained vehicle 224 so that the requestor 202 may continue travel using the scooter 222 to travel from the alternate location 214 to the alternate location 216.

Additionally, or alternatively, the lane-constrained vehicle 224 of the provider 228 may provide transportation to one or more requestors in addition to the requestor 202 for the portion of the trip 210 from the pickup location 212 to the alternate location 214 (e.g., leg 230a). At the alternate location 214, one or more requestors may be transported to respective other locations using respective personal mobility vehicles (e.g., scooters) for transport. The other locations may be drop-off locations or alternate locations where a requestor may transfer to another lane-constrained vehicle of a provider in order to complete travel to a drop-off location.

Additionally, or alternatively, the scooter 222 may transport the requestor 202 from the alternate location 214 to the alternate location 216 where the requestor 202 may transfer to a shared ride provided by the lane-constrained vehicle 234 of the provider 238 for the portion of the trip 210 from the alternate location 216 to the drop-off location 218 (e.g., leg 230c).

For example, the dynamic transportation matching system may arrange the trip 210 as a multi-leg trip 230a-c at the time of the transportation request by the requestor 202. For example, in some cases, the dynamic transportation matching system may dynamically change the trip while the requestor 202 is in route to the drop-off location 218. For example, the dynamic transportation matching system may initially direct the provider 228 to transport the requestor 202 from the pickup location 212 directly to the drop-off location 218. The dynamic transportation matching system, however, may later determine it would be more efficient for the requestor 202, the provider 228, and/or one or more additional requestors (if the transport is shared) to be dropped off at the alternative location 214 for travel by scooter 222 to the alternate location 218 for transfer to the lane-constrained vehicle 234 of the provider 238. For example, the dynamic transportation matching system may determine that the route for travel between the alternate location 214 and the alternate location 216 (e.g., leg 230b) is congested. The dynamic transportation matching system may determine that the requestor 202 and/or the provider 228 and/or the provider 238 would save time and/or expense by matching the requestor 202 to the scooter 222 for travel between the alternate location 214 and the alternate location 216. Accordingly, the dynamic transportation matching system may notify the requestor 202 and/or the provider 228 and/or the provider 238 during the trip 210 to arrange for the modification to the trip 210.

Figure 3:
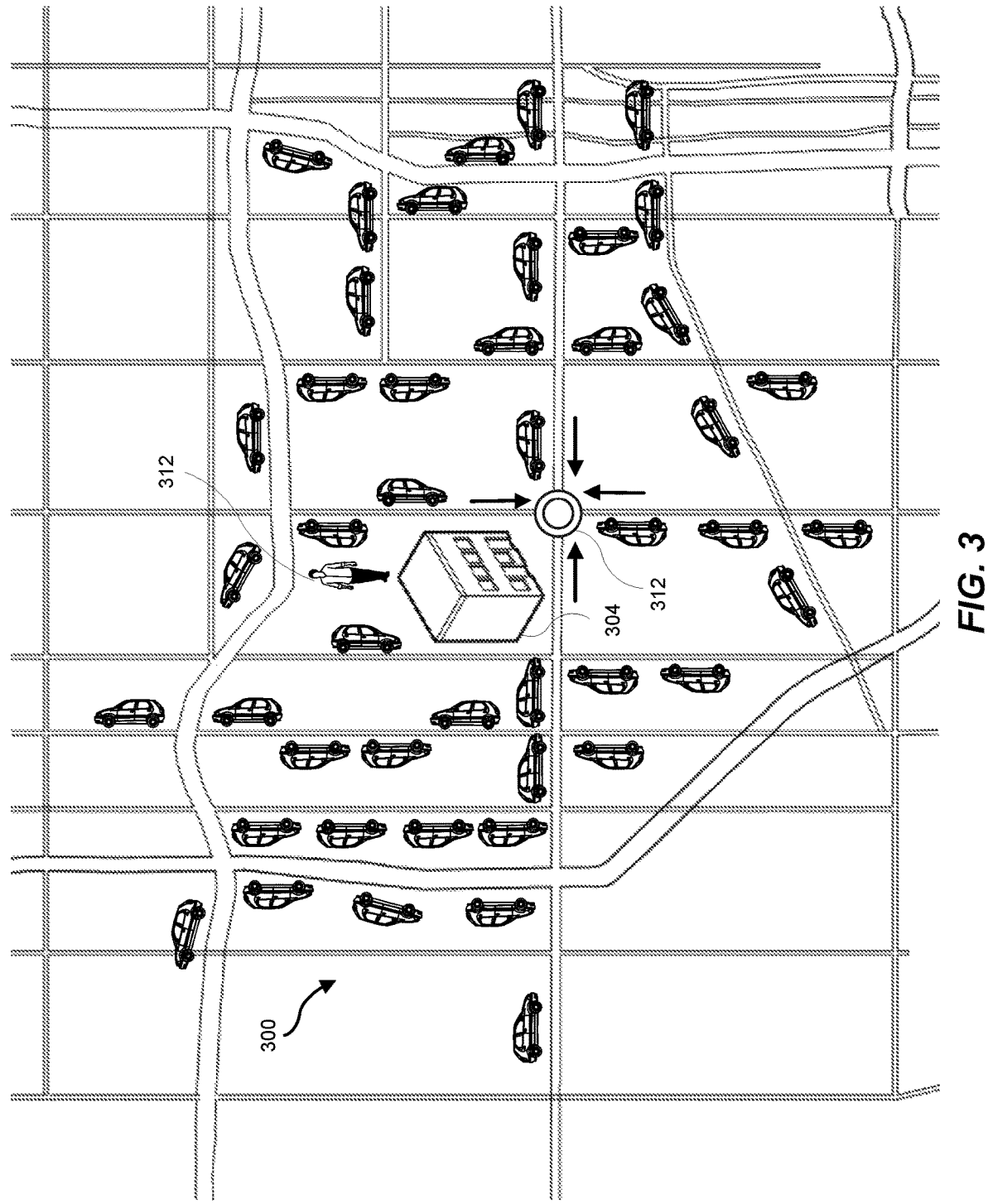
FIG. 3 is an illustration showing lane-constrained vehicle traffic congestion around a venue.

FIG. 3 is an illustration showing lane-constrained vehicle traffic congestion 300 around a venue 304. For example, a requestor 302 may have attended an event at the venue 304. At the end of the event, the requestor 302 requests transportation from the venue 304 (e.g., from a pickup location 312). The lane-constrained vehicle traffic congestion 300 may be caused by lane-constrained vehicles traveling to the venue 304 to pick up transportation requestors as well as, once the lane-constrained vehicle picks up the requestor, the lane-constrained vehicle then needs to travel away from the venue 304. The lane-constrained vehicle traffic congestion 300 may adversely affect the time it takes for a lane-constrained vehicle of a provider to complete the transportation request based on the lane-constrained vehicle traffic congestion 300. In addition, or in the alternative, the lane-constrained vehicle traffic congestion 300 may adversely affect travel time from the pickup location 312 to a drop-off location as specified by the requestor 302. Therefore, the completion of the transportation request and the completion of the transport as experienced by the requestor 302 includes the time it takes to complete the transportation request (the wait time from the requestor 302 making the transportation request until arrival of a transportation provider at the pickup location 312) as well as the travel time from the pickup location 312 to a drop-off or destination location.

Figure 4:
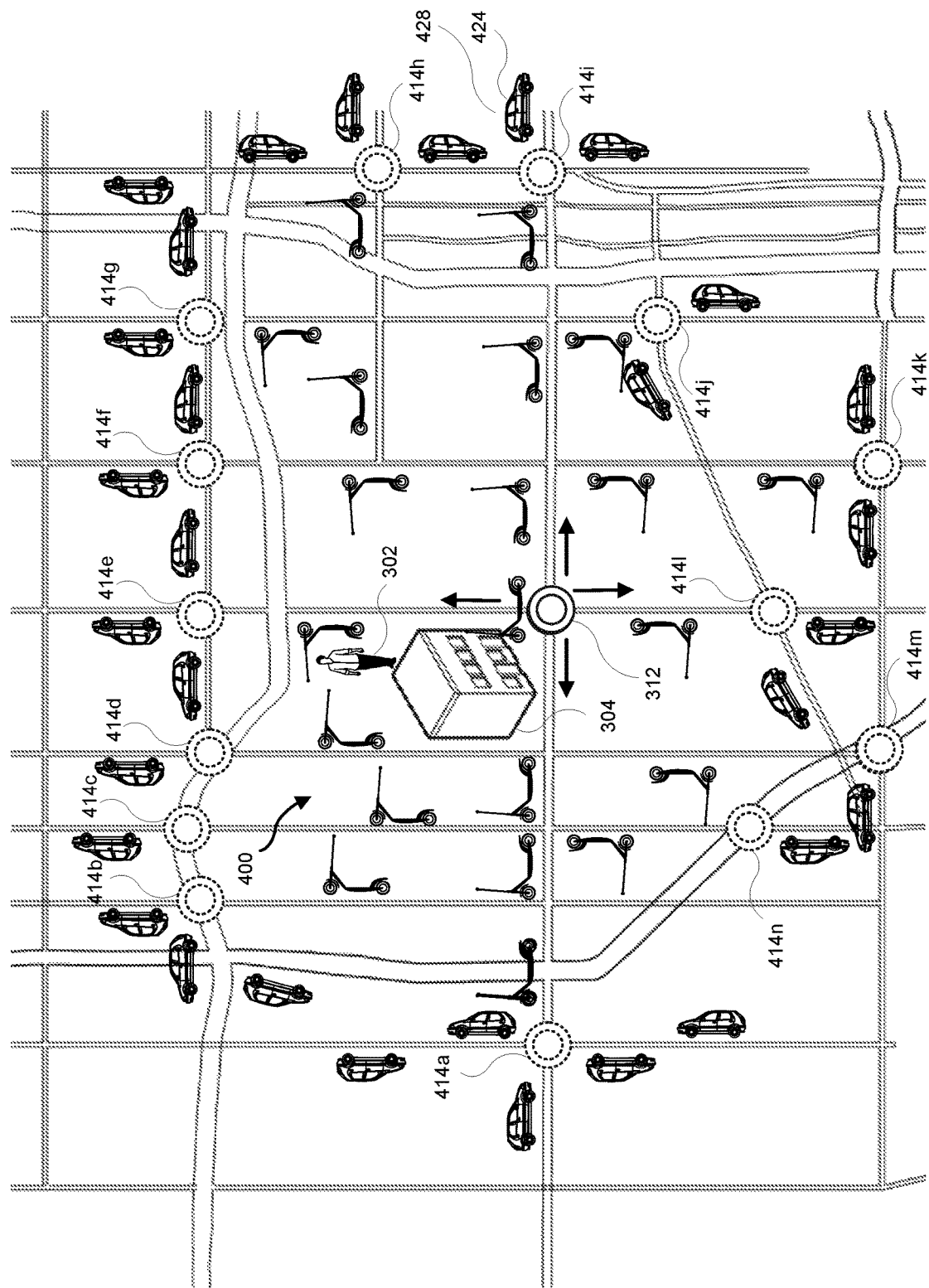
FIG. 4 is an illustration showing personal mobility vehicles for use from a venue to alternate locations away from lane-constrained traffic congestion.

FIG. 4 is an illustration showing personal mobility vehicles 400 for use from the venue 304 to alternate locations 414a-n away from the lane-constrained traffic congestion 300 as shown in FIG. 3. A personal mobility vehicle (e.g., a scooter) can transport a transportation requestor (e.g., the transportation requestor 302) from a pickup location (e.g., the pickup location 312) to an alternate location (e.g., alternate location 414i) to meet (rendezvous with, pickup, transfer to) a lane-constrained vehicle of a transportation provider (e.g., lane-constrained vehicle 424 of a transportation provider 428). A dynamic transportation matching system may identify the alternate location 414i to improve (reduce) the overall travel time for the requestor 302 that may include the time it takes for a lane-constrained vehicle of a provider to complete the transportation request as well as the travel time for the transport of the requestor 302 from the pickup location to a destination or drop-off location.

As shown in FIG. 4, the availability of personal mobility vehicles in an area surrounding the venue 304 that exhibits high traffic congestion (as shown in FIG. 3) may allow for easy and quick transport of a requestor away from the area of high traffic congestion to locations outside of the high traffic congestion area that may be more easily (and more quickly) reachable by a lane-constrained vehicle of a transportation provider. The personal mobility vehicle (e.g., a scooter) may transport the requestor to an alternate location to meet (and/or rendezvous with, pickup, and/or transfer to) a lane-constrained vehicle of a transportation provider. The personal mobility vehicle and the lane-constrained vehicle of the provider may be used in combination to transport a requestor from the venue 304 (e.g., the pickup location 312) to a destination or drop-off location as specified by the transportation requestor.

Figure 5:
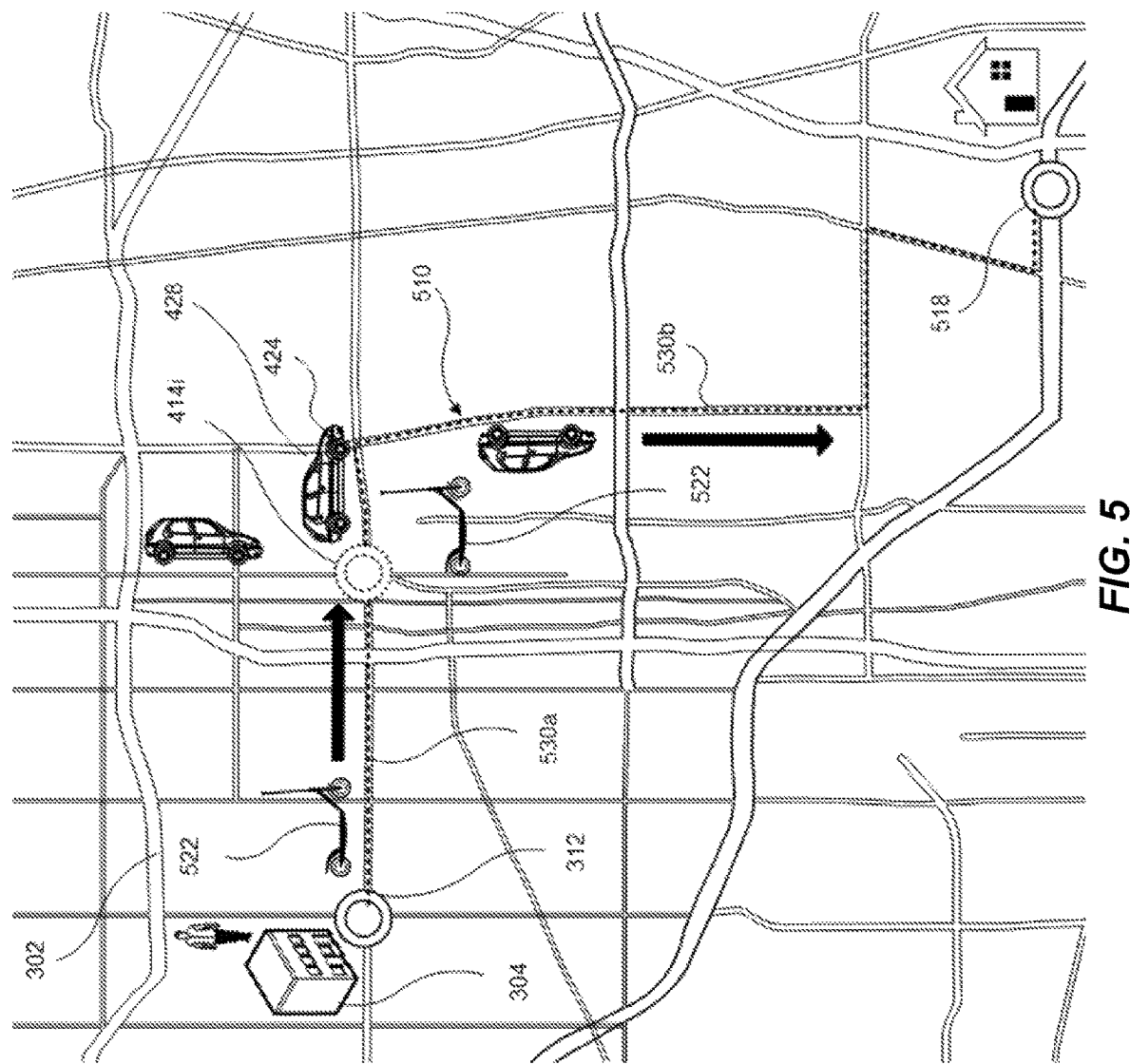
FIG. 5 is an illustration of an example trip using a personal mobility for a first leg of a trip along with a lane-constrained vehicle of a provider for a second leg of the trip.

FIG. 5 is an illustration of an example trip 510 using a personal mobility vehicle (e.g., a personal mobility vehicle 522) for a first leg 530a of the trip 510 along with a lane-constrained vehicle of a provider (e.g., the lane-constrained vehicle 424 of the provider 428) for a second leg 530b of the trip 510.

Referring also to FIG. 3 and FIG. 4, the transportation requestor 302 may request transportation from the pickup location 312. The transportation requestor 302 may request the transportation from the venue 304 at a time when there is significant lane-constrained traffic congestion on all routes going to and from the venue 304 (e.g., a sporting event held at the venue 304 just ended and everyone is headed out of the venue 304). A dynamic transportation matching system may be aware of the traffic congestion surrounding the venue 304 at the time of the receipt of a transportation request. For example, the dynamic transportation matching system may access an online system (e.g., an online mapping system, an online department of transportation web site) that may provide real-time traffic conditions for a specified location (e.g., latitude and longitude, street address). In another example, the dynamic transportation matching system may receive a real-time traffic feed from various web providers.

Based on the lane-constrained vehicle traffic congestion surrounding the venue 304, in some implementations, the dynamic transportation matching system may identify a personal mobility vehicle for use in combination with a lane-constrained vehicle of a transportation provider to efficiently complete a transportation request and/or to provide improved (e.g., reduced) travel time for a trip.

For example, a dynamic transportation matching system may predict that many requestors may request transportation from the venue 304 (e.g., a pickup location 312) within a relatively short time window (e.g., following the completion of an event). Based on the prediction, the dynamic transportation matching system may plan on having personal mobility vehicles (e.g., scooters as shown in FIG. 4) ready for use near the venue 304 at the completion of the event. In addition, or in the alternative, the dynamic transportation matching system may complete transportation requests by involving requestors riding away a short distance from the pickup location 312 (e.g., the venue 304) utilizing a personal mobility vehicle (e.g., a scooter) in order to avoid the lane-constrained vehicle traffic congestion at the venue 304 (e.g., as shown in FIG. 3) and/or to reduce request density at the pickup location 312. The requestor can then transfer to a lane-constrained vehicle of a provider for completion of travel to a requested destination or drop-off location.

In some implementations, a dynamic transportation matching system may identify an alternate location for the transportation requestor to meet up with a lane-constrained vehicle of a provider based on one or more factors that can include, but are not limited to, a closest alternate location that allows the lane-constrained vehicle of the provider to meet the requestor while avoiding the traffic congestion, an alternate location that is not only outside of the traffic congestion but in a general direction of a drop-off location (assuming that the dynamic transportation matching system is aware of a drop-off location when receiving the transportation request), an alternate location that is not only outside of the traffic congestion but in a general direction of a drop-off location and that is along a less traffic congested route to the drop-off location (assuming that the dynamic transportation matching system is aware of a drop-off location when receiving the transportation request), an alternate location that includes a docking area for scooters, an alternate location that provides a general waiting area for transportation providers (e.g., a parking lot, (off street parking vs. on street parking)) making the transition from a scooter to a lane-constrained vehicle of the provider smoother and easier.

Referring to FIGS. 3, 4, and 5, the transportation requestor 302 may request transportation from the pickup location 312 following the completion of an event at the venue 304. In some cases, the transportation request may include a drop-off location 518. As described, based on the traffic congestion surrounding the venue 304 at the time of the transportation request, the dynamic transportation matching system may identify a personal mobility vehicle (e.g., the scooter 522) for use by the requestor 302 for transport from the pickup location 312 to the alternate location 414i. As described, for example, the dynamic transportation matching system may identify the alternate location 414i based on the alternate location 414i being outside of the traffic congestion and in the general direction of the drop-off location 518 (if the dynamic transportation matching system is aware of the drop-off location when receiving the transportation request). The scooter 522 can transport the requestor 302 along the first leg 530a of the trip 510, taking the requestor 302 from the pickup location 312 to the alternate location 414i where the requestor 302 can meet the lane-constrained vehicle 424 of the provider 428 and transfer from the scooter 522 to the lane-constrained vehicle 424 for completion of a second leg 530b of the trip 510.

Figure 6:
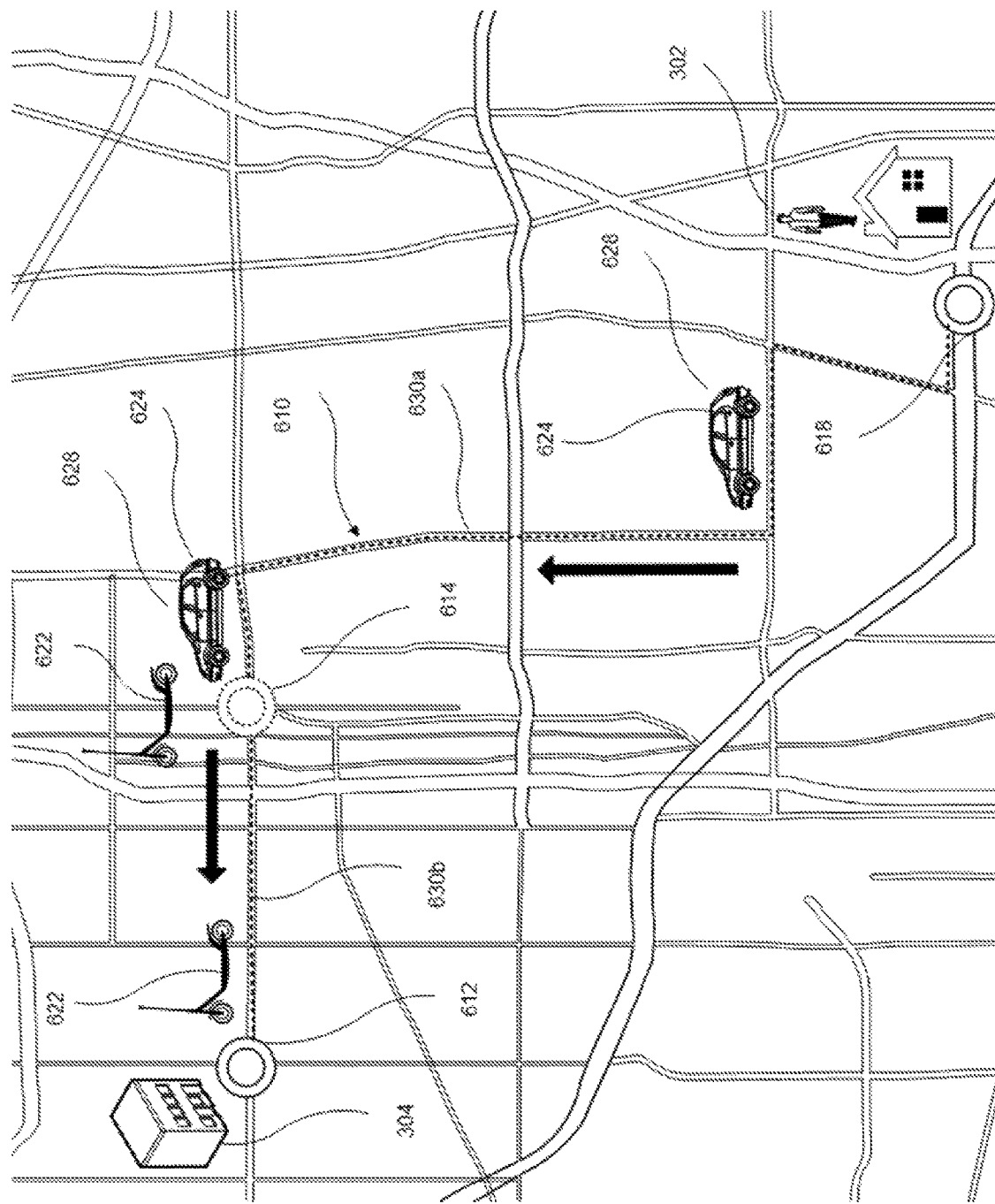
FIG. 6 is an illustration of an example trip using a lane-constrained vehicle of a provider for a first leg of the trip along with a personal mobility vehicle for a second leg of the trip.

FIG. 6 is an illustration of an example trip 610 using a lane-constrained vehicle of a provider (e.g., a lane-constrained vehicle 624 of a provider 628) for a first leg 630a of the trip 610 along with a personal mobility vehicle (e.g., a scooter 622) for a second leg 630b of the trip 610.

Referring also to FIG. 3, the transportation requestor 302 may request transportation from a pickup location 618. In cases where the transportation request includes a drop-off location 612, a dynamic transportation matching system may determine that the drop-off location 612 is located within traffic congestion surrounding a venue (e.g., the venue 304). For example, the dynamic transportation matching system may determine that there is significant lane-constrained traffic congestion on all routes going to and from the venue 304 (e.g., a sporting event is being held at the venue 304 and people are headed towards the venue 304). A dynamic transportation matching system may be aware of the traffic congestion surrounding the venue 304 at the time of the receipt of a transportation request based on one or more inputs as described herein.

Based on the lane-constrained vehicle traffic congestion surrounding the venue 304, in some implementations, the dynamic transportation matching system may identify a personal mobility vehicle for use in combination with a lane-constrained vehicle of a transportation provider to efficiently complete the transportation request and/or to provide improved (e.g., reduced) travel time for a trip. In addition, or in the alternative, anticipating significant traffic congestion surrounding the venue 304 at the end of the event, the dynamic transportation matching system may identify a personal mobility vehicle for use in combination with a lane-constrained vehicle of a transportation provider to complete the trip from a pickup location to a drop-off location at or near the venue where the personal mobility vehicle can later be used by the requestor (or by another requestor) in combination with a lane-constrained vehicle of a provider to complete a trip from the venue to a destination or drop-off location. In some implementations, the requestor 302 may be provided an incentive (or compensated) for using the personal mobility vehicle for part of the travel. For example, the requestor 302 may receive a discount on the cost of the trip 610 or monetary credit for use on future travel. In another example, the requestor 302 may reserve the scooter 622 for use when leaving the venue 304 (e.g., as described with reference to FIG. 5). In general, the use of the scooter 622 to travel from the alternate location 614 to the drop-off location 612 may contribute to increasing availability of scooters for use in completing transportation requests after the completion of the event at the venue 304.

For example, the requestor 302 may request transportation from the pickup location 618 to the drop-off location 612 at or near the venue 304. As described, the dynamic transportation matching system may identify the scooter 622 for use in combination with the lane-constrained vehicle 624 of the transportation provider 628 to complete the trip 610. As described, in some cases, the dynamic transportation matching system may identify the scooter 622 for use in combination with the lane-constrained vehicle 624 of the transportation provider 628 in order to improve (reduce) travel time from the pickup location 618 to the drop-off location 612. As described, for example referring to FIG. 5, a dynamic transportation matching system may identify an alternate location 614 based on one or more factors. The alternate location 614 may allow the transportation requestor to quickly and easily transfer from the lane-constrained vehicle 624 of the transportation provider 628 to the scooter 622. The alternate location 614 may be outside of traffic congestion around the venue 304 yet within a reasonable distance for travel using the scooter 622. The alternate location 614 may include a docking area for scooters.

Figure 7:
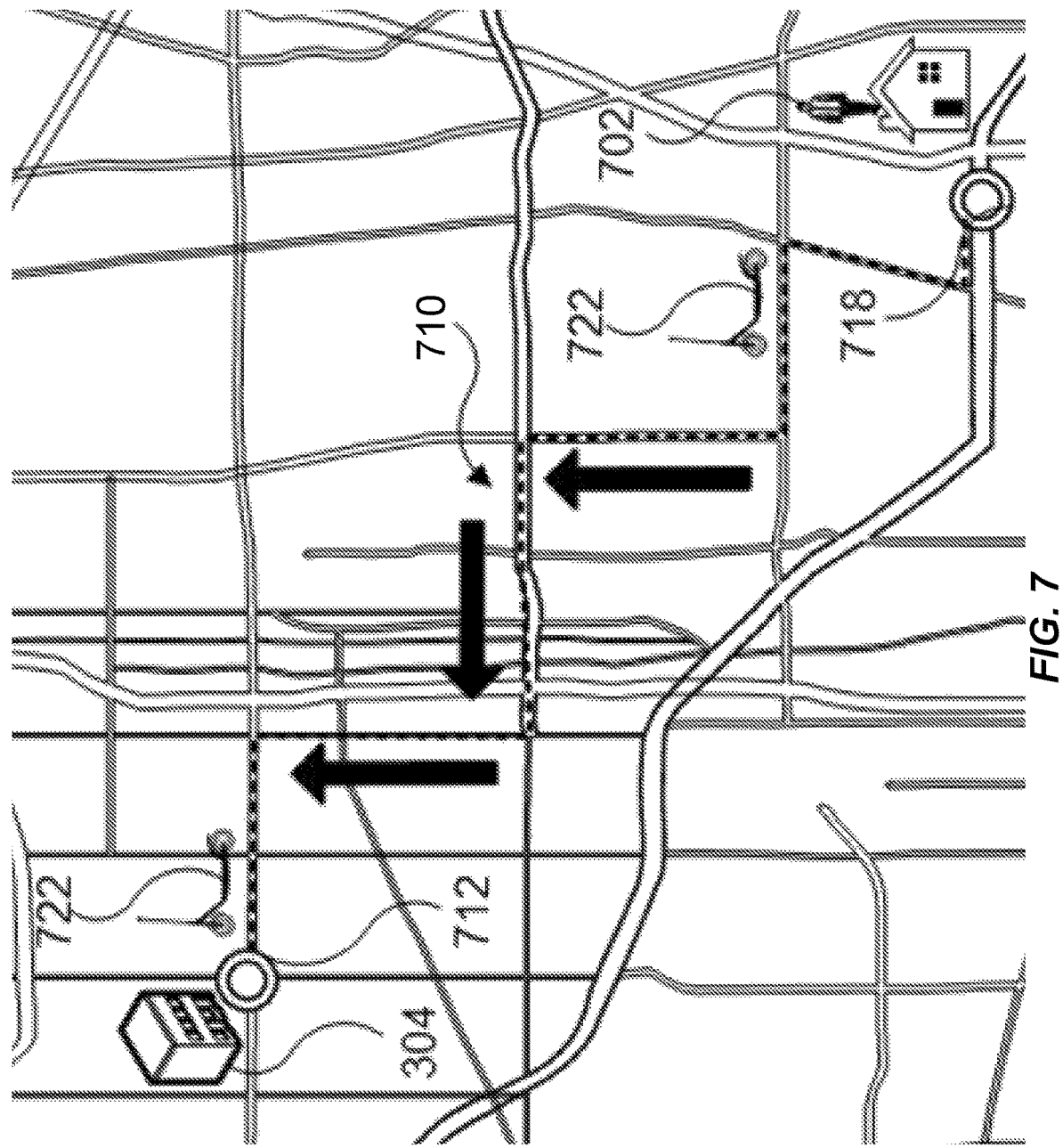
FIG. 7 is an illustration of an example trip using a personal mobility vehicle for the trip.

FIG. 7 is an illustration of an example trip 710 using a personal mobility vehicle (e.g., scooter 722) for a trip 710. The scooter 722 may transport a transportation requestor 702 from a starting location 718 to an ending location 712. For example, the scooter 722 may have transported the transportation requestor 702 to the starting location 718 as part of a previous trip. The transportation requestor 702 may decide to use the scooter 722 to travel to the ending location 712, which is at or near the venue 304.

As described with reference to FIG. 6, use of the scooter 722 for transport of the transportation requestor 702 from the starting location 718 to the ending location 712 may avoid travel delays based on the use of a lane-constrained vehicle of a transportation provider for travel along the same route (the trip 710) or for travel along an alternate route. Also, as described with reference to FIG. 6, use of a personal mobility vehicle (e.g., the scooter 722) may benefit the transportation provider 702. For example, the scooter 722 may be available for use by the transportation requestor 702 (and/or other requestors) when the event at the venue 304 is over and traffic surrounding the venue 304 may be congested. For example, the transportation requestor 702 may prefer using a lane-constrained vehicle of a transportation provider (either alone or in combination with a scooter) when leaving the venue 304.

Figure 8:
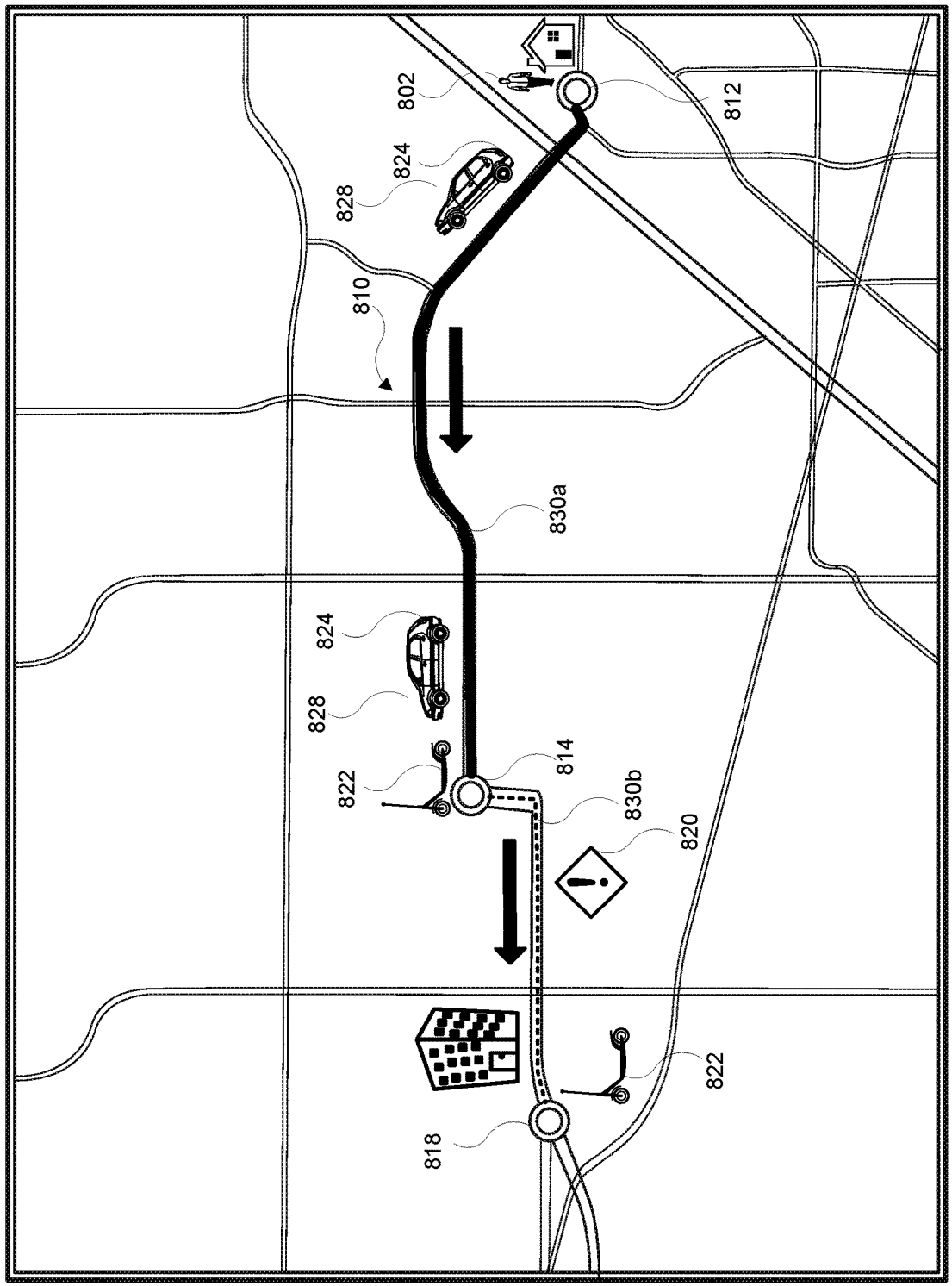
FIG. 8 is an illustration of an example trip impacted by delays caused by an accident on a route used for travel from a pickup location to a drop-off location.

FIG. 8 is an illustration of an example trip 810 impacted by delays caused by an accident 820 on a route (e.g., a road) used for travel from a pickup location 812 to a drop-off location 818. The example trip 810 may use a lane-constrained vehicle of a provider (e.g., a lane-constrained vehicle 824 of a provider 828) for a first leg 830a of the trip 810 along with a personal mobility vehicle (e.g., a scooter 822) for a second leg 830b of the trip 810.

The transportation requestor 802 may request transportation from the pickup location 812 and, in this example, the transportation request may include a drop-off location 818. A dynamic transportation matching system may be aware of traffic congestion near the drop-off location 818 at the time of the receipt of the transportation request. For example, the dynamic transportation matching system may access an online system (e.g., an online mapping system, an online department of transportation web site) that may provide real-time traffic conditions for a specified location (e.g., latitude and longitude, street address, etc. for the drop-off location 818). In another example, the dynamic transportation matching system may receive a real-time traffic feed from various web providers. The dynamic transportation matching system can use the received traffic information to identify, in the example shown in FIG. 8, the accident 820.

As described, based on the accident 820 creating traffic congestion near the drop-off location 818 and/or along the second leg 830b of the trip 810, the dynamic transportation matching system may identify a personal mobility vehicle (e.g., the scooter 822) for use by the requestor 802 for transport from an alternate location 814 to the drop-off location 818. The dynamic transportation matching system may identify the scooter 822 for use in combination with the lane-constrained vehicle 824 of the transportation provider 828 in order to improve (reduce) travel time from the pickup location 812 to the drop-off location 818. As described, a dynamic transportation matching system may identify the alternate location 814 based on one or more factors. The alternate location 814 may allow the transportation requestor 802 to quickly and easily transfer from the lane-constrained vehicle 824 of the transportation provider 828 to the scooter 822. The alternate location 814 may be outside of the traffic congestion near the drop-off location 818 and in the general direction of the drop-off location 818 (e.g., along the second leg 830b of the trip 810) yet within a reasonable distance for travel using the scooter 822. The alternate location 814 may include a docking area for scooters.

The lane-constrained vehicle 824 of the transportation provider 828 can transport the requestor 802 from the pickup location 812 to the alternate location 814 along the first leg 830a of the trip 810. The requestor 802 can transfer from the lane-constrained vehicle 824 of the transportation provider 828 to the scooter 822. The scooter 822 can transport the requestor 802 along the second leg 830b of the trip 810, taking the requestor 802 from the alternate location 814 to the drop-off location 818 for completion of the second leg 830b of the trip 810. For example, use of the scooter 822 by the transportation requestor 802 may be possible along the second leg 830b of the trip 810 because the scooter 822 may not necessarily travel on a road, therefore, able to circumvent the accident 820.

Figure 9:
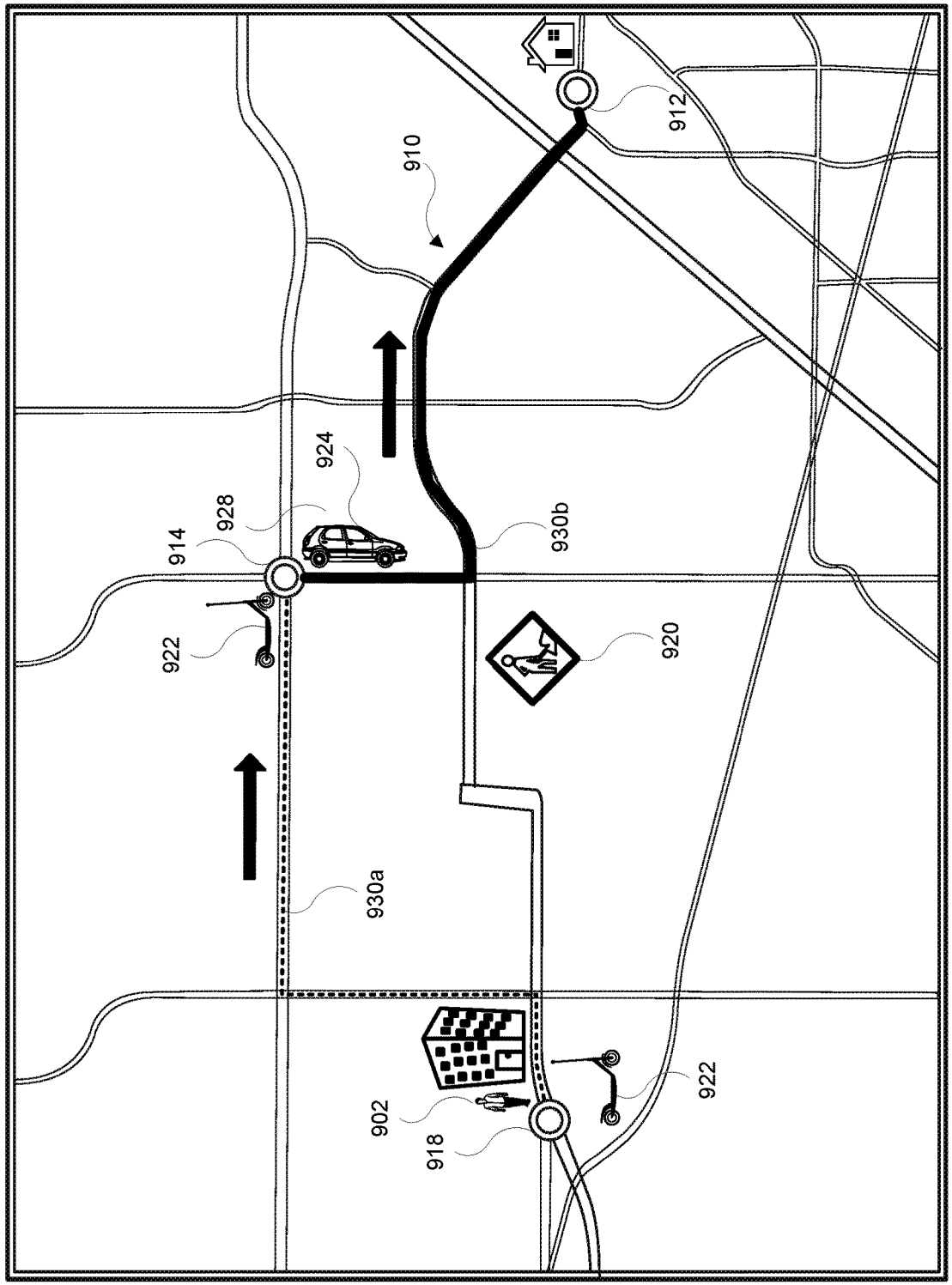
FIG. 9 is an illustration of an example trip impacted by delays caused by construction on a road used for travel from a pickup location to a drop-off location.

FIG. 9 is an illustration of an example trip 910 impacted by delays caused by construction on a road (road construction 920) used for travel from a pickup location 918 to a drop-off location 912. The example trip 910 may use a personal mobility vehicle (e.g., a scooter 922) for a first leg 930a of the trip 910 along with a lane-constrained vehicle of a provider (e.g., a lane-constrained vehicle 924 of a provider 928) for a second leg 930b of the trip 910.

The transportation requestor 902 may request transportation from the pickup location 918. A dynamic transportation matching system may be aware of traffic congestion near the pickup location 918 at the time of the receipt of the transportation request. For example, the dynamic transportation matching system may access an online system (e.g., an online mapping system, an online department of transportation web site) that may provide real-time traffic conditions for a specified location (e.g., latitude and longitude, street address, etc. for the pickup location 918). In another example, the dynamic transportation matching system may receive a real-time traffic feed from various web providers. The dynamic transportation matching system can use the received traffic information to identify, in the example shown in FIG. 9, the road construction 920.

As described, based on the road construction 920 creating traffic congestion near the pickup location 918 and/or along the first leg 930a of the trip 910, the dynamic transportation matching system may identify a personal mobility vehicle (e.g., the scooter 922) for use by the requestor 902 for transport from the pickup location 918 to an alternate location 914. The dynamic transportation matching system may identify the scooter 922 for use in combination with the lane-constrained vehicle 924 of the transportation provider 928 in order to improve (reduce) travel time away from the pickup location 918. As described, a dynamic transportation matching system may identify the alternate location 914 based on one or more factors. The alternate location 914 may allow the transportation requestor 902 to quickly and easily transfer from the scooter 922 to the lane-constrained vehicle 924 of the transportation provider 928. The alternate location 914 may be outside of the traffic congestion near the pickup location 918 and within a reasonable distance for travel using the scooter 922. The alternate location 914 may include a docking area for scooters.

In cases where the drop-off location 912 is not specified in the transportation request, once the transportation requestor transfers to the lane-constrained vehicle 924 of the transportation provider 928, the lane-constrained vehicle 924 of the transportation provider 928 can transport the requestor 902 from the alternate location 914 along the second leg 830b of the trip 910 to the drop-off location 912.

Figure 10:
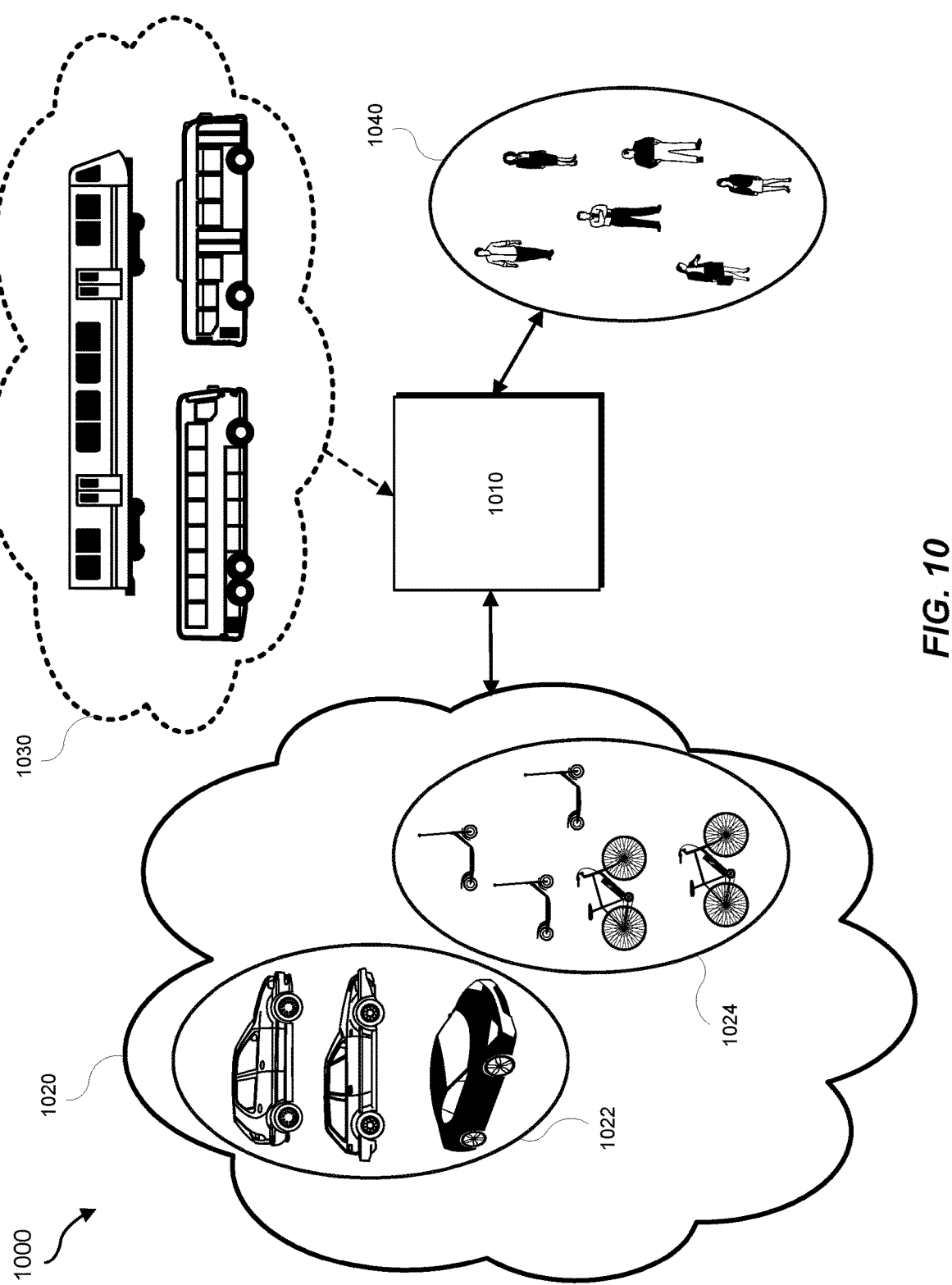
FIG. 10 shows an example system for providing dynamic transportation with a dynamic transportation network that includes personal mobility vehicles.

For example, referring to FIG. 9 and FIG. 10, the dynamic transportation matching system may monitor the speed of a lane-constrained vehicle of a transportation provider satisfying a transportation request along all or parts of a route to determine a speed (e.g., an average speed (travel of a particular distance over a period of time)). The speed may indicate that there is traffic along the route (e.g., a speed of travel between two points along the route is below a speed limit for the route). Based on the reduced speed of the transportation provider, the dynamic transportation matching system may assume that an incident on the route (e.g., an accident, construction) has occurred.

FIG. 10 shows an example system 1000 for providing dynamic transportation with a dynamic transportation network that includes personal mobility vehicles. As shown in FIG. 10, vehicles 1020 may include lane-constrained vehicles 1022 (e.g., automobiles and/or cars) as well as personal mobility vehicles 1024 (e.g., electronic scooters (referred to also as scooters) and electronic bicycles (referred to also as bicycles)). For example, the personal mobility vehicles 1024 may also include any motorized device (e.g., electric, gas, propane, diesel, human-powered, etc.) that includes a computing device that may be mounted on the personal mobility vehicle. The computing device may be used for management and interaction with the dynamic transportation network. A lane-constrained vehicle may be operated by a driver and a transportation requestor may be a passenger in the lane-constrained vehicle. In some implementations, the driver may be a person. In some implementations, a lane-constrained vehicle may be an autonomous vehicle. The transportation requestor may operate a personal mobility vehicle.

The vehicles 1020 may operate as part of a dynamic transportation network managed by a dynamic transportation matching system 1010. Thus, the dynamic transportation matching system 1010 may be in communication with the vehicles 1020 (and/or provider devices associated with the vehicles 1020) to receive information relevant to making transportation matches (e.g., location information, availability information, etc.) as well as to provide matching instructions once transportation matches have been made.

In addition to the vehicles 1020, in some examples, the dynamic transportation matching system 1010 may also be in communication with vehicles 1030. In some examples, vehicles 1030 may not operate as a part of the dynamic transportation network. For example, the dynamic transportation matching system 1010 may not manage or direct the vehicles 1030. Instead, the vehicles 1030 may provide predictable and/or reliable transportation upon which the dynamic transportation matching system 1010 may rely when making matches. For example, the vehicles 1030 may include buses, subways, trains, and the like that may (i) run on fixed schedules known to the dynamic transportation matching system 1010 and/or (ii) make available information to the dynamic transportation matching system 1010 allowing the dynamic transportation matching system 1010 to predict departure and arrival times. While the dynamic transportation matching system 1010 may not manage or control the vehicles 1030, in some examples, the dynamic transportation matching system 1010 may interact with systems that may manage transportation provided by the vehicles 1030. For example, the dynamic transportation matching system 1010 may procure tickets to ride one or more of the vehicles 1030 on behalf of one or more of requestors 1040 and/or may notify one or more of the vehicles 1030 of the status of one or more of the requestors 1040. When the dynamic transportation matching system 1010 receives transportation requests from one or more of the requestors 1040, the dynamic transportation matching system 1010 may match the transportation request with one or more providers among the vehicles 1020 and/or the vehicles 1030 based on any of a variety of factors.

For example, the dynamic transportation matching system 1010 may match the transportation request based on the current and/or projected location of and/or the current and/or projected availability of each candidate provider. In some examples, the dynamic transportation matching system 1010 may match the transportation requestor to a first provider instead of a second provider in order to maintain availability of the second provider for another current or prospective requestor. In some examples, the dynamic transportation matching system 1010 may match the transportation requestor based on a suitability of a candidate provider for completing the transportation request. For example, the dynamic transportation matching system 1010 may determine that a long-distance trip is suited for a lane-constrained vehicle but may determine that a relatively short trip is suited for a personal mobility vehicle. In some examples, the dynamic transportation matching system 1010 may match a transportation requestor to multiple providers. For example, the dynamic transportation matching system 1010 may match a lane-constrained vehicle to one leg of a trip, a mass transit vehicle to another leg of the trip, and a personal mobility vehicle to a third leg of the trip.

Figure 11:
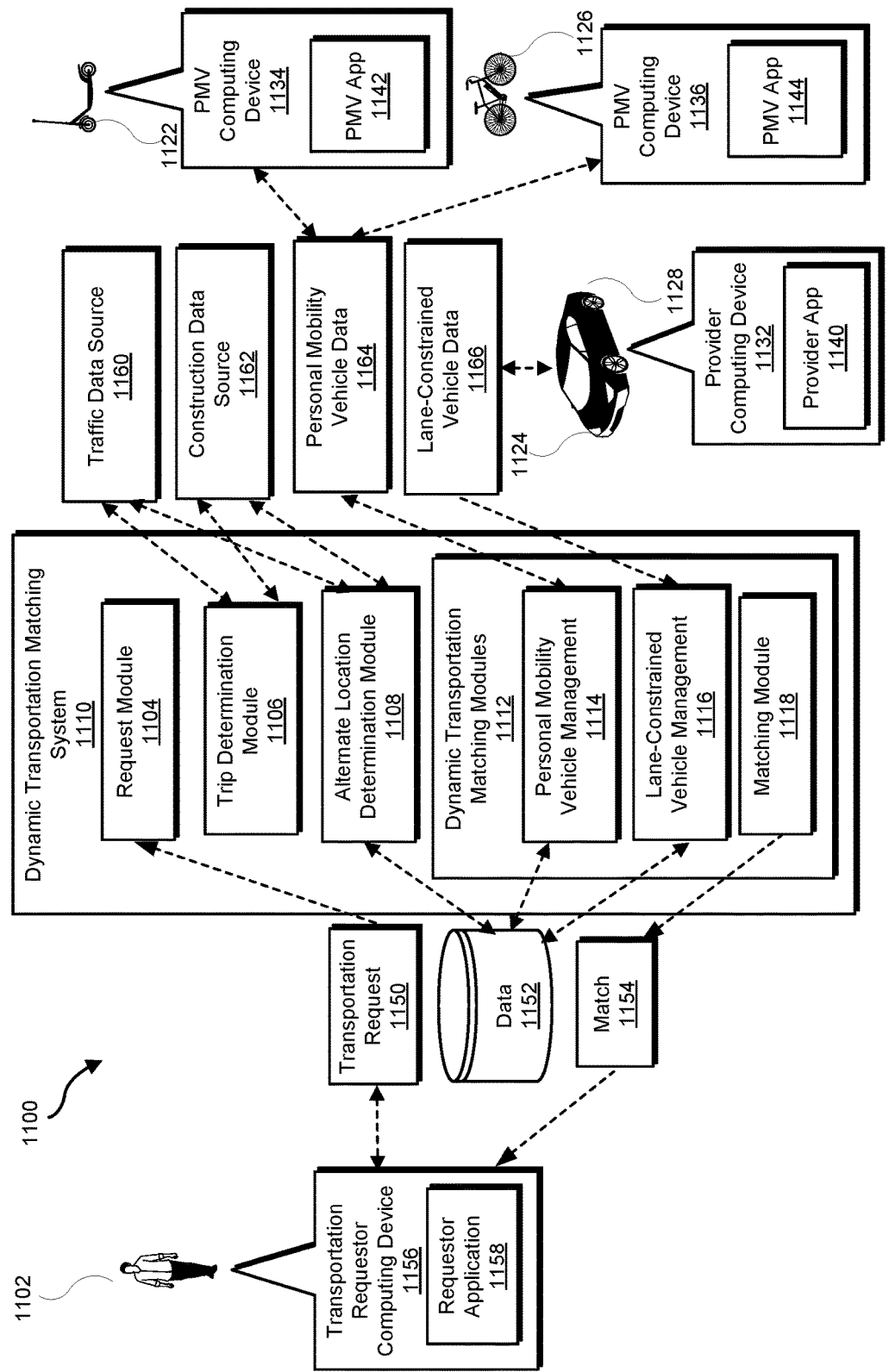
FIG. 11 is a block diagram of an example system for matching transportation requests with a dynamic transportation network that includes personal mobility vehicles.

FIG. 11 is a block diagram of an example system 1100 for matching transportation requests with a dynamic transportation network that includes personal mobility vehicles. FIG. 11 shows a transportation requestor 1102 and a transportation provider 1128 interacting with a dynamic transportation matching system 1110.

As shown in FIG. 11, a dynamic transportation matching system 1110 may be configured with one or more dynamic transportation matching modules 1112 that may perform one or more of the steps described herein. The dynamic transportation matching system 1110 may represent any computing system and/or set of computing systems capable of matching transportation requests. The dynamic transportation matching system 1110 may be in communication with a provider computing device 1132 in a lane-constrained vehicle 1124 of the transportation provider 1128. The dynamic transportation matching system 1110 may be in communication with personal mobility vehicle (PMV) computing device 1134 and personal mobility vehicle (PMV) computing device 1136 included in (e.g., mounted on) personal mobility vehicle 1122 (e.g., scooter 1122) and personal mobility vehicle 1126 (e.g., bicycle 1126), respectively. The example dynamic transportation matching system 1110 can be in communication with one or more lane-constrained vehicles, and/or one or more personal mobility vehicles.

The personal mobility vehicle 1122, the personal mobility vehicle 1126, and the lane-constrained vehicle 1124 may represent any vehicles that may fulfill transportation requests. In some examples, personal mobility vehicle 1122, the personal mobility vehicle 1126, and the lane-constrained vehicle 1124 may include disparate vehicle types and/or models. In some examples, the personal mobility vehicle 1122, the personal mobility vehicle 1126, and/or the lane-constrained vehicle 1124 may be standard commercially available vehicles. In some examples, the personal mobility vehicle 1122, the personal mobility vehicle 1126, and/or the lane-constrained vehicle 1124 may be owned by separate individuals (e.g., transportation providers). Furthermore, while, in some examples, the personal mobility vehicle 1122, the personal mobility vehicle 1126, and/or the lane-constrained vehicle 1124 may be human-operated, in some examples the personal mobility vehicle 1122, the personal mobility vehicle 1126, and/or the lane-constrained vehicle 1124 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 11 does not specify a number of lane-constrained vehicles or a number of personal mobility vehicles, it may be readily appreciated that the systems described herein are applicable to hundreds of vehicles, thousands of vehicles, or more. In one example, the dynamic transportation matching system 1110 may coordinate transportation matchings within a single region for 50,000 vehicles or more on a given day. In some examples, the personal mobility vehicle 1122, the personal mobility vehicle 1126, and/or the lane-constrained vehicle 1124 may collectively form a dynamic transportation network that may provide transportation supply on an on-demand basis to transportation requestors.

As mentioned above, dynamic transportation matching system 1110 may communicate with the provider computing device 1132, the PMV computing device 1134 and the PMV computing device 1136. The provider computing device 1132, the PMV computing device 1134 and the PMV computing device 1136 may be any suitable type of computing device. In some examples, one or more of the provider computing device 1132, the PMV computing device 1134 and the PMV computing device 1136 may be integrated into the respective lane-constrained vehicle 1124, the personal mobility vehicle 1122, and the personal mobility vehicle 1126. In some examples, one or more of the provider computing device 1132, the PMV computing device 1134 and the PMV computing device 1136 may be mobile devices. For example, one or more of the provider computing device 1132, the PMV computing device 1134 and the PMV computing device 1136 may be smartphones.

Additionally, or alternatively, one or more of the provider computing device 1132, the PMV computing device 1134 and the PMV computing device 1136 may be tablet computers, personal digital assistants, or any other type or form of mobile computing device. According to some examples, one or more of the provider computing device 1132, the PMV computing device 1134 and the PMV computing device 1136 may include wearable computing devices (e.g., a driver-wearable computing device), such as smart glasses, smart watches, etc. In some examples, one or more of the provider computing device 1132, the PMV computing device 1134 and the PMV computing device 1136 may be a device suitable for temporarily mounting in a lane-constrained vehicle or for temporarily mounting on a personal mobility vehicle (e.g., for use by a requestor and/or provider for a transportation matching application, a navigation application, and/or any other application suited for the use of requestors and/or providers). Additionally or alternatively, one or more of the provider computing device 1132, the PMV computing device 1134 and the PMV computing device 1136 may be a device suitable for installing in a vehicle and/or may be a computer of a vehicle that has a transportation management system application installed on the computer in order to provide transportation services to transportation requestors and/or communicate with dynamic transportation matching system 1110.

As shown in FIG. 11, the provider computing device 1132 may include a provider application 1140, the PMV computing device 1134 may include a PMV application 1142, and the PMV computing device 1136 may include a PMV application 1144. The provider application 1140, the PMV application 1142, and the PMV application 1144 each may represent any application, program, and/or module that may provide one or more services related to operating a vehicle and/or providing transportation matching services. For example, the provider application 1140 may include a transportation matching application for providers. In some examples, the provider application 1140 may match the user of the provider application 1140 (e.g., a transportation provider) with transportation requestors through communication with the dynamic transportation matching system 1110.

In addition, and as is described in greater detail herein, the provider application 1140, the PMV application 1142, and the PMV application 1144 each may provide the dynamic transportation matching system 1110 with information about the vehicle and/or the provider (including, e.g., the current location of the provider and/or the vehicle) to enable the dynamic transportation matching system 1110 to provide dynamic transportation matching and/or management services for the provider and one or more requestors. In some examples, the provider application 1140, the PMV application 1142, and the PMV application 1144 each may coordinate communications and/or a payment. In some cases, the payment may be between a requestor and a provider. In some cases, a payment may be between the requestor and the dynamic transportation matching system 1110. According to some embodiments, the provider application 1140, the PMV application 1142, and the PMV application 1144 each may provide a map service, a navigation service, a traffic notification service, and/or a geolocation service.

Embodiments of the instant disclosure may include or be implemented in conjunction with the dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a ridesharing service, a ride sourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

As shown in FIG. 11, the dynamic transportation matching system 1110 may include dynamic transportation matching modules 1112, a request module 1104, a trip determination module 1106, and an alternate location determination module 1108 that may perform one or more of the processes, methods, or steps described herein. In some embodiments, the request module 1104 may be configured using a single module or multiple modules. In some embodiments, the trip determination module 1106 may be configured using a single module or multiple modules. In some embodiments, the alternate location determination module 1108 may be configured using a single module or multiple modules.

The dynamic transportation matching system 1110 may receive a transportation request 1150 at the request module 1104 from a transportation requestor computing device 1156 of the transportation requestor 1102. The transportation requestor computing device 1156 may include a requestor application 1158. The requestor application 1158 may be an application, a program, and/or a module that may provide one or more services related to the providing of on-demand transportation and services that may include contacting a transportation service to request transportation and completing the transportation request and/or a trip using one or more lane-constrained vehicles in combination with one or more personal mobility vehicles.

The trip determination module 1106 may determine one or more routes for completing the transportation request. The trip determination module 1106 may receive traffic information from a traffic data source 1160 and road construction information from a construction data source 1162, as described herein. Based on a determined trip to a pickup location as specified in the transportation request 1150 and a drop-off location as may be specified in the transportation request 1150, the trip determination module 1106 can determine a best route for providing and completing the transportation request 1150 and, in some cases, for a best route for completing a trip from the pickup location to the drop-off location. As described herein, the trip determination module 1106 may identify traffic bottlenecks along a trip. For example, a best route may be based on distance (e.g., the route with the fewest number of miles to travel). For example, a best route may be based on time (e.g., the route with the fastest travel time). For example, the best route may be based on an estimated time of arrival (e.g., a best combination of travel time and travel miles).

The dynamic transportation matching system 1110 can use the alternate location determination module 1108 to identify one or more alternate locations relevant to a travel route that may be available as locations for picking up and/or dropping off a personal mobility vehicle and/or for transferring between a personal mobility vehicle and a lane-constrained vehicle. For example, a personal mobility vehicle (e.g. the PMV computing device 1134 of the personal mobility vehicle 1122) can provide personal mobility vehicle data 1164 to a personal mobility vehicle management module 1114 included in the dynamic transportation matching modules 1112. The personal mobility vehicle management module 1114 can provide the data to a repository 1152 for storage and subsequent retrieval and use by the alternate location determination module 1108 when the dynamic transportation matching system 1110 identifies one or more alternate locations for a trip. For example, the provider computing device 1132 of the lane-constrained vehicle 1124 can provide lane-constrained vehicle data 1166 to a lane-constrained vehicle management module 1116 included in the dynamic transportation matching modules 1112. The lane-constrained vehicle management module 1116 can provide the data to the repository 1152 for storage and subsequent retrieval and use by the alternate location determination module 1108 when the dynamic transportation matching system 1110 identifies one or more alternate locations for a trip. The personal mobility vehicle data 1164 can include information about the personal mobility vehicle. The information can include, but is not limited to, a geographic location of the personal mobility vehicle, the availability of the personal mobility vehicle (e.g., has it been reserved, is it functional (e.g., battery is charged)), etc. The lane-constrained vehicle data 1166 can include, but is not limited to, a geographic location of the lane-constrained vehicle of a provider, the availability of a lane-constrained vehicle of a provider, etc.

The matching module 1118 included in the dynamic transportation matching modules 1112 may match the transportation requestor 1102 with the lane-constrained vehicle 1124 of the transportation provider 1128 and/or with one or more of the personal mobility vehicle 1122 and the personal mobility vehicle 1126, as described herein, using information provided by the trip determination module 1106 and the alternate location determination module 1108. The matching module 1118 may provide a match 1154 to the transportation requestor computing device 1156 that includes information about the lane-constrained vehicle 1124 of the transportation provider 1128 and/or the one or more of the personal mobility vehicle 1122 and the personal mobility vehicle 1126 for use in completing a transportation request and/or a trip.

Figure 12:
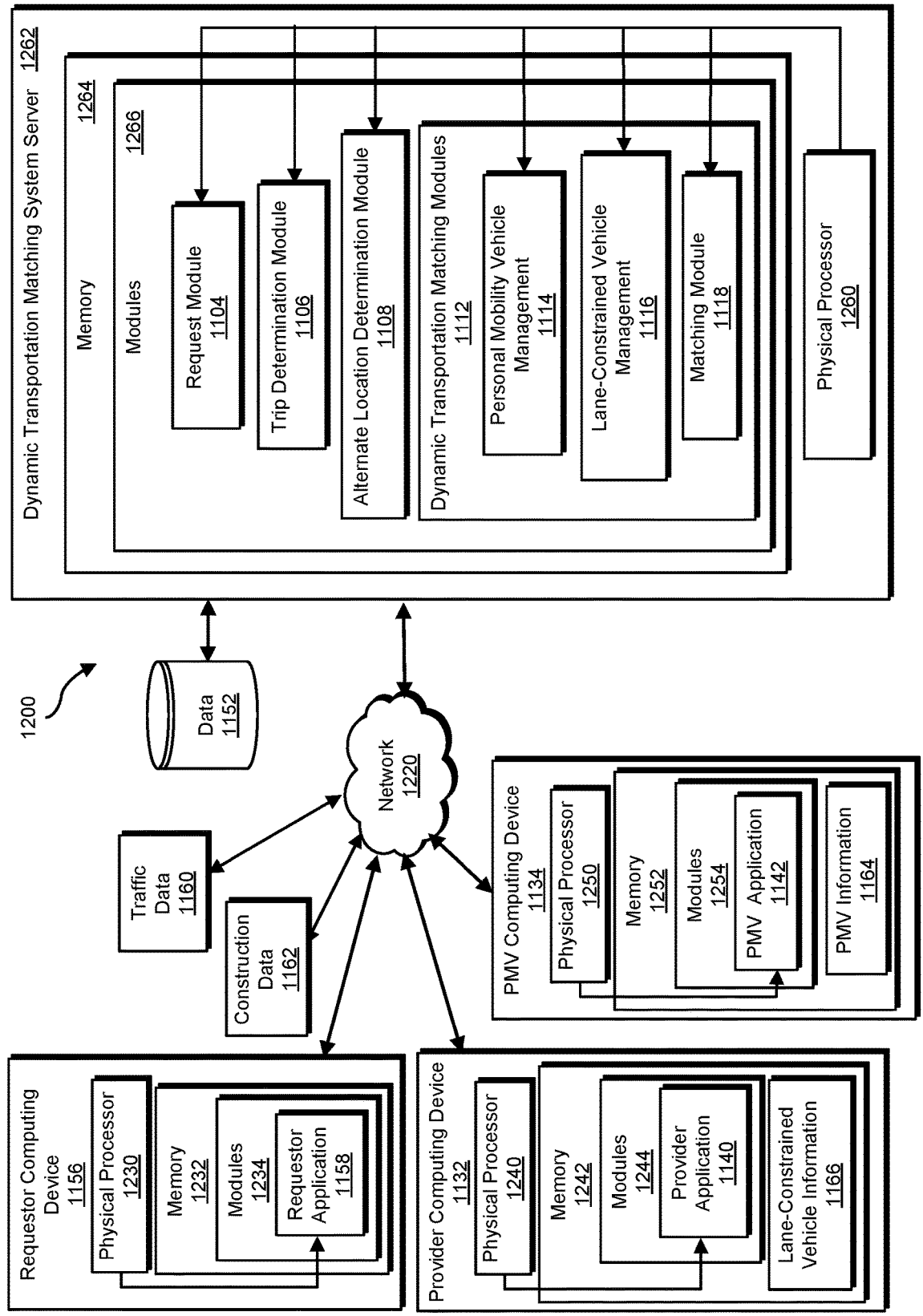
FIG. 12 is a block diagram of an example transportation matching system that may identify transportation requests that can be more efficiently completed with the use of a personal mobility vehicle.

FIG. 12 is a block diagram of an example transportation matching system 1200 that may identify transportation requests that can be more efficiently completed with the use of a personal mobility vehicle.

Referring at times to FIG. 11, the transportation management system 1200 may include a dynamic transportation matching system server 1262. The dynamic transportation matching system server 1262 may include a memory 1264 which may include one or more modules 1266. The module(s) 1266 may include the dynamic transportation matching modules 1112, the request module 1104, the trip determination module 1106, and the alternate location determination module 1108. The dynamic transportation matching system server 1262 may include at least one physical processor 1260. In some implementations, the dynamic transportation matching system 1110 may be included as part of the dynamic transportation matching system server 1262.

The transportation management system 1200 may include the transportation requestor computing device 1156 that is communicatively coupled to the dynamic transportation matching system server 1262 by way of a network 1220. The transportation management system 1200 may include the transportation provider computing device 1132 that is communicatively coupled to the dynamic transportation matching system server 1262 by way of the network 1220. The transportation management system 1200 may include the personal mobility vehicle computing device 1134 that is communicatively coupled to the dynamic transportation matching system server 1262 by way of the network 1220.

The transportation requestor computing device 1156 includes a memory 1232 which may include one or more modules 1234. The module(s) 1234 may include the requestor application 1158. The transportation requestor computing device 1156 may include at least one physical processor 1230.

The transportation provider computing device 1132 includes a memory 1242 which may include one or more modules 1244. The module(s) 1244 may include the provider application 1140. The memory 1242 includes the lane-constrained vehicle data 1166. The transportation provider computing device 1132 may include at least one physical processor 1240.

The personal mobility vehicle computing device 1134 includes a memory 1252 which may include one or more modules 1254. The module(s) 1254 may include the personal mobility vehicle application 1142. The memory 1252 includes the personal mobility vehicle data 1164 for the personal mobility vehicle 1122. The personal mobility vehicle computing device 1134 may include at least one physical processor 1250. Similar to the personal mobility vehicle computing device 1134, the personal mobility vehicle computing device 1136 may also include one or more modules that may include the personal mobility vehicle application 1144. The memory may include the personal mobility vehicle data 1164 for the respective personal mobility vehicle 1126. The personal mobility vehicle computing device 1134 may include at least one physical processor.

The traffic data source 1160 and/or the construction data source 1162 may be based in the cloud or provided from one or more servers external to the dynamic transportation matching system server 1262 that may communicate with the dynamic transportation matching system server 1262 by way of the network 1220.

As detailed above, the computing devices and systems described and/or illustrated herein broadly represent any type or form of computing device or system capable of executing computer-readable instructions, such as those contained within the modules and applications described herein. In their most basic configuration, these computing device(s) may each include at least one memory device and at least one physical processor.

The transportation management system 1200 may include one or more repositories such as the data repository 1152. In some examples, the term "repository" generally refers to any type or form of data storage. A repository may include one or more data stores, such as databases, object storage systems and services, cloud-based storage services, and other data stores. In some implementations, a repository may be implemented on a non-transitory storage medium accessible by the dynamic transportation matching system server 1262. For example, as shown in FIG. 12, the data repository 1152 may be locally connected or coupled to, or directly interfaced to, the dynamic transportation matching system server 1262. In some implementations, the data repository 1152 may be communicatively coupled to the dynamic transportation matching system server 1262 by way of the network 1220. In some implementations, the data repository 1152 may be included as part of a storage-area network or other networked storage system.

In some examples, the term "memory device" generally refers to any type or form of volatile or non-volatile storage device or medium capable of storing data and/or computer-readable instructions. In one example, a memory device may store, load, and/or maintain one or more of the applications and/or modules described herein. Examples of memory devices may include, but are not limited to, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory devices. In another example, a physical processor may execute computer-readable instructions included in one or more of the applications and/or modules stored in the above-described memory devices. Examples of physical processors may include, but are not limited to, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain implementations one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data regarding cancelled transportation requests to be transformed. One or more of the modules recited herein may transform the cancelled transportation request related data that may include information regarding external factors as well as progress information for a transportation provider. One or more of the modules recited herein may output a result of the transformation to create, update, and/or modify one or more data-driven models using machine learning. One or more of the modules recited herein may use the result of the transformation to identify a transportation requestor matched with a first transportation provider whose match is eligible for cancellation. One or more of the modules recited herein may use the result of the transformation to identify a second transportation provider for matching with the transportation requestor responsive to the cancellation of the matching of the transportation requestor with the first transportation provider. One or more of the modules recited herein may store the result of the transformation. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

Figure 13:
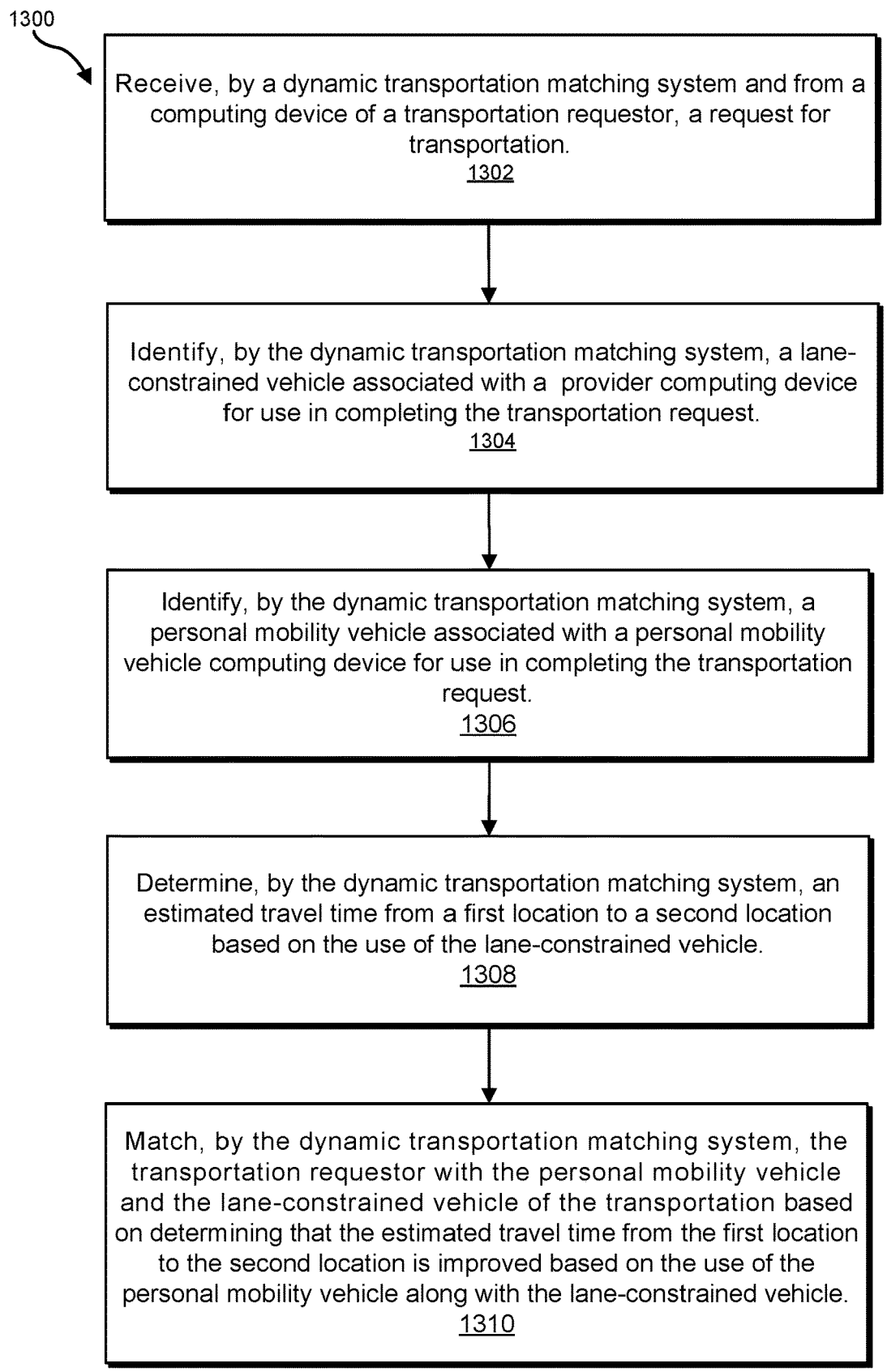
FIG. 13 is a flow diagram of an exemplary computer-implemented method for combining a lane-constrained vehicle with a personal mobility vehicle to complete a transportation request.

FIG. 13 is a flow diagram of an exemplary computer-implemented method 1300. The steps shown in FIG. 13 may be performed by any suitable computer-executable code and/or computing system, including the system(s) illustrated in FIG. 11 and FIG. 12. In one example, each of the steps shown in FIG. 13 may represent an algorithm whose structure includes and/or is represented by multiple sub-steps, examples of which will be provided in greater detail below.

As illustrated in FIG. 13, at step 1302 one or more of the systems described herein may receive, by a dynamic transportation matching system and from a computing device of a transportation requestor, a request for transportation. For example, the request module 1104 may receive the transportation request. The systems described herein may perform step 1302 in a variety of ways. In one example, the request module 1104 may receive the transportation request 1150 from the transportation requestor computing device 1156 by way of the network 1220.

At step 1304 one or more of the systems described herein may identify, by the dynamic transportation matching system, a lane-constrained vehicle associated with a provider computing device for use in completing the transportation request. For example, the matching module 1118 may identify a lane-constrained vehicle of a transportation provider for possible matching with the transportation requestor for use in completing the transportation request. The systems described herein may perform step 1304 in a variety of ways. In one example, the matching module 1118 using information provided by the trip determination module 1106 and the alternate location determination module 1108 may identify a lane-constrained vehicle of a transportation provider for possible matching with the transportation requestor for use in completing the transportation request.

At step 1306 one or more of the systems described herein may identify, by the dynamic transportation matching system, a personal mobility vehicle associated with a personal mobility vehicle computing device for use in completing the transportation request. For example, the matching module 1118 may identify a personal mobility vehicle associated with a personal mobility vehicle computing device for possible matching with the transportation requestor for use in completing the transportation request. The systems described herein may perform step 1306 in a variety of ways. In one example, the matching module 1118 using information provided by the trip determination module 1106 and the alternate location determination module 1108 may identify a personal mobility vehicle for possible matching with the transportation requestor for use in completing the transportation request.

At step 1308 one or more of the systems described herein may determine, by the dynamic transportation matching system, an estimated travel time from a first location to a second location based on the use of the lane-constrained vehicle. For example, the matching module 1118 interfacing with the trip determination module 1106 may determine the estimated travel time for travel by the lane-constrained vehicle between the first location and the second location. The systems described herein may perform step 1308 in a variety of ways. In one example, the matching module 1118 using information provided by the trip determination module 1106 and the trip determination module 1106 calculate the estimated travel time between the first location and the second location.

At step 1310 one or more of the systems described herein may match, by the dynamic transportation matching system, the transportation requestor with the personal mobility vehicle and the lane-constrained vehicle of the transportation provider based on determining that the estimated travel time from the first location to the second location is improved based on the use of the personal mobility vehicle along with the lane-constrained vehicle. For example, the matching module 1118 may match the transportation requestor with the personal mobility vehicle and the lane-constrained vehicle of the transportation provider for use in completing the transportation request. The systems described herein may perform step 1308 in a variety of ways. In one example, the matching module 1118 using information provided by the trip determination module 1106 and the alternate location module may match the transportation requestor with the personal mobility vehicle and the lane-constrained vehicle of the transportation provider for use in completing the transportation request. The matching of the transportation requestor with the personal mobility vehicle may be further based on determining that an estimated travel time from a first location to a second location is improved based on the use of the personal mobility vehicle.

In some examples, the method may further include determining, by the dynamic transportation matching system, that there is lane-constrained vehicle traffic congestion proximate to the first location.

In some examples, the method may further include identifying, by the dynamic transportation matching system, an intermediate location away from the first location, the intermediate location being outside of the lane-constrained vehicle traffic congestion.

In some examples, identifying the intermediate location may further include determining that a distance between the first location and the intermediate location is travelable by the personal mobility vehicle.

In some examples, identifying the intermediate location may further include determining that a route between the first location and the intermediate location is travelable by the personal mobility vehicle.

In some examples, identifying the intermediate location may further include determining that rendezvousing of the transportation requestor with the lane-constrained vehicle of the transportation provider is accomplishable at the intermediate location In some examples, the personal mobility vehicle may transport the transportation requestor from the starting location to the intermediate location.

In some examples, the lane-constrained vehicle of the transportation provider may transport the transportation requestor from the intermediate location to the second location.

In some examples, the lane-constrained vehicle of the transportation provider may transport the transportation requestor from the second location to the intermediate location.

In some examples, the personal mobility vehicle may transport the transportation requestor from the intermediate location to the first location.

In some examples, matching the transportation requestor with the personal mobility vehicle and the lane-constrained vehicle of the transportation provider may further include determining that that the personal mobility vehicle will arrive at the intermediate location in sufficient time to allow a transfer of the transportation requestor from the personal mobility vehicle to the lane-constrained vehicle of the transportation provider.

In some examples, at least one attribute of the personal mobility vehicle may indicate that the personal mobility vehicle is located within a threshold distance of the intermediate location.

In some examples, at least one attribute of the lane-constrained vehicle of the transportation provider may indicate that the lane-constrained vehicle is located within a threshold distance of the second location.

In some examples, identifying the intermediate location further includes determining that at least one attribute of the transportation request may indicate that the transportation requestor has requested a shared ride.

In some examples, the intermediate location may be a pickup location for the shared ride.

In some examples, the method may further include providing, by the dynamic transportation matching system, a benefit associated with the transportation request based on the at least one attribute of the personal mobility vehicle.

A corresponding system for combining a lane-constrained vehicle with a personal mobility vehicle to complete a transportation request may include one or more physical processors and one or more memories coupled to one or more of the physical processors, the one or more memories including instructions operable when executed by the one or more physical processors to cause the system to perform operations including: (i) receiving, by a dynamic transportation matching system and from a computing device of a transportation requestor, a request for transportation, (ii) identifying, by the dynamic transportation matching system, a lane-constrained vehicle associated with a provider computing device for use in completing the transportation request, (iii) identifying, by the dynamic transportation matching system, a personal mobility vehicle associated with a personal mobility vehicle computing device for use in completing the transportation request, (iv) determining, by the dynamic transportation matching system, an estimated travel time from a first location to a second location based on the use of the lane-constrained vehicle, and (v) matching, by the dynamic transportation matching system, the transportation requestor with the personal mobility vehicle and the lane-constrained vehicle of the transportation provider based on determining that the estimated travel time from the first location to the second location is improved based on the use of the personal mobility vehicle along with the lane-constrained vehicle.

A corresponding non-transitory computer-readable storage medium may include computer-readable instructions that, when executed by at least one processor of a computing device, cause the computing device to: (i) receive, by a dynamic transportation matching system and from a computing device of a transportation requestor, a request for transportation, (ii) identify, by the dynamic transportation matching system, a lane-constrained vehicle associated with a provider computing device for use in completing the transportation request, (iii) identify, by the dynamic transportation matching system, a personal mobility vehicle associated with a personal mobility vehicle computing device for use in completing the transportation request, (iv) determine, by the dynamic transportation matching system, an estimated travel time from a first location to a second location based on the use of the lane-constrained vehicle, and (v) match, by the dynamic transportation matching system, the transportation requestor with the personal mobility vehicle and the lane-constrained vehicle of the transportation provider based on determining that the estimated travel time from the first location to the second location is improved based on the use of the personal mobility vehicle along with the lane-constrained vehicle.

Features from any of the above-mentioned examples may be used in combination with one another in accordance with the general principles described herein. These and other examples, embodiments, features, and advantages will be more fully understood upon reading the detailed description in conjunction with the accompanying drawings and claims.

Figure 14:
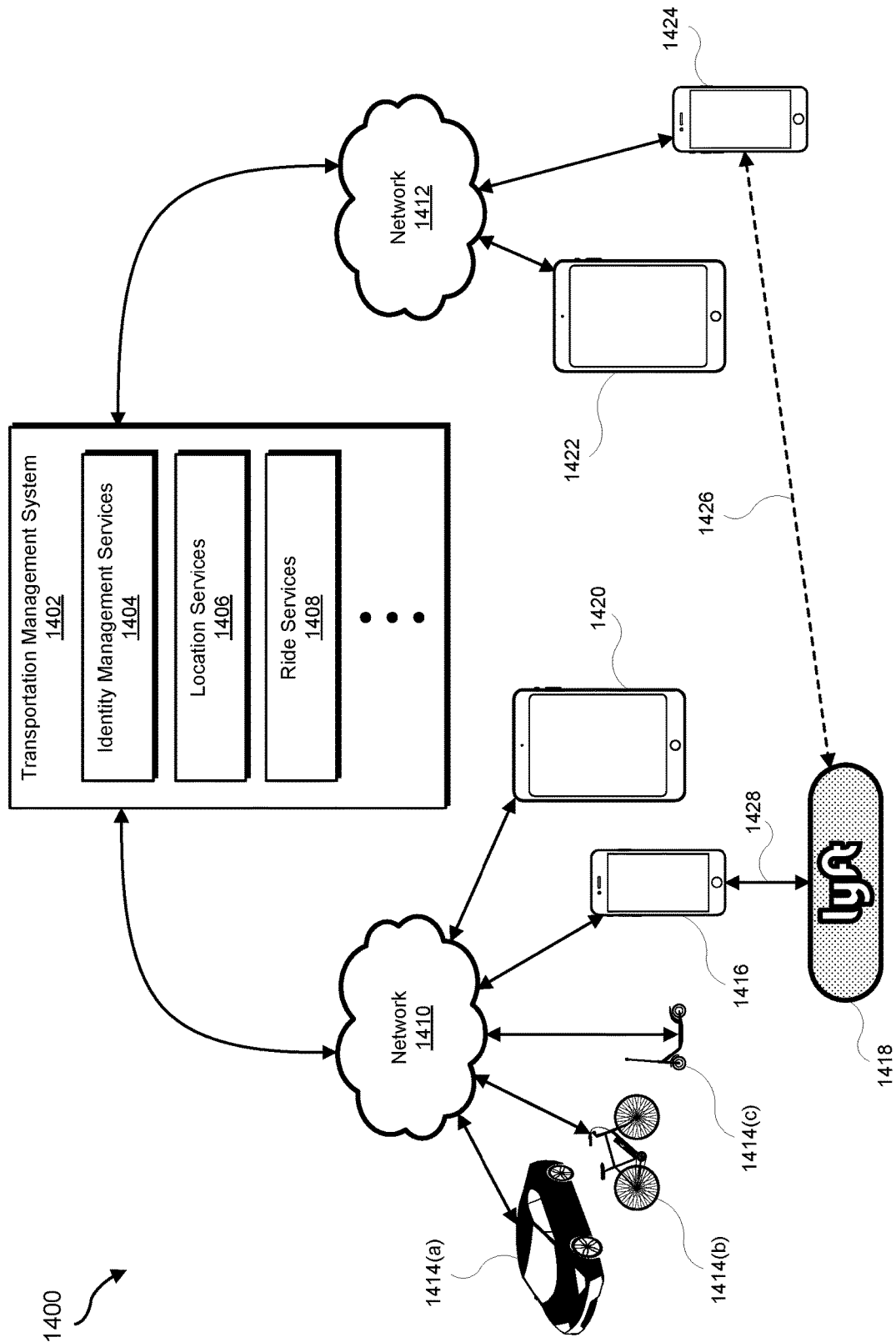
FIG. 14 shows a transportation management environment in accordance with various embodiments.

FIG. 14 shows a transportation management environment 1400, in accordance with various embodiments. As shown in FIG. 14, a transportation management system 1402 may run one or more services and/or software applications, including identity management services 1404, location services 1406, ride services 1408, and/or other services. Although FIG. 14 shows a certain number of services provided by transportation management system 1402, more or fewer services may be provided in various implementations. In addition, although FIG. 14 shows these services as being provided by transportation management system 1402, all or a portion of any of the services may be processed in a distributed fashion. For example, computations associated with a service task may be performed by a combination of transportation management system 1402 (including any number of servers, databases, etc.), one or more devices associated with a provider (e.g., devices integrated with managed vehicles 1414(a), 1414(b), and/or 1414(c), provider computing devices 1416 and tablets 1420, and transportation management vehicle devices 1418), and/or more or more devices associated with a ride requestor (e.g., the computing devices of the requestor 1424 and tablets 1422). In some embodiments, transportation management system 1402 may include one or more general purpose computers, server computers, clustered computing systems, cloud-based computing systems, and/or any other computing systems or arrangements of computing systems. Transportation management system 1402 may be configured to run any or all of the services and/or software components described herein. In some embodiments, the transportation management system 1402 may include an appropriate operating system and/or various server applications, such as web servers capable of handling hypertext transport protocol (HTTP) requests, file transfer protocol (FTP) servers, database servers, etc.

In some embodiments, identity management services 1404 may be configured to perform authorization services for requestors and providers and/or manage their interactions and/or data with transportation management system 1402. This may include, e.g., authenticating the identity of providers and determining that they are authorized to provide services through transportation management system 1402. Similarly, requestors' identities may be authenticated to determine whether they are authorized to receive the requested services through transportation management system 1402. Identity management services 1404 may also manage and/or control access to provider and/or requestor data maintained by transportation management system 1402, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1402 may also manage and/or control access to provider and/or requestor data stored with and/or obtained from third-party systems. For example, a requester or provider may grant transportation management system 1402 access to a third-party email, calendar, or task management system (e.g., via the credentials of the user). As another example, a requestor or provider may grant, through a mobile device (e.g., 1416, 1420, 1422, or 1424), a transportation application associated with transportation management system 1402 access to data provided by other applications installed on the mobile device. In some examples, such data may be processed on the client and/or uploaded to transportation management system 1402 for processing.

In some embodiments, transportation management system 1402 may provide ride services 1408, which may include ride matching and/or management services to connect a requestor to a provider. For example, after identity management services module 1404 has authenticated the identity a ride requestor, ride services module 1408 may attempt to match the requestor with one or more ride providers. In some embodiments, ride services module 1408 may identify an appropriate provider using location data obtained from location services module 1406. Ride services module 1408 may use the location data to identify providers who are geographically close to the requestor (e.g., within a certain threshold distance or travel time) and/or who are otherwise a good match with the requestor. Ride services module 1408 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1408 may use rule-based algorithms and/or machine-learning models for matching requestors and providers.

Transportation management system 1402 may communicatively connect to various devices through networks 1410 and/or 1412. Networks 1410 and 1412 may include any combination of interconnected networks configured to send and/or receive data communications using various communication protocols and transmission technologies. In some embodiments, networks 1410 and/or 1412 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1410 and/or 1412 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1410 and/or 1412 may include any combination of networks described herein or any other type of network capable of facilitating communication across networks 1410 and/or 1412.

In some embodiments, transportation management vehicle device 1418 may include a provider communication device configured to communicate with users, such as drivers, passengers, pedestrians, and/or other users. In some embodiments, transportation management vehicle device 1418 may communicate directly with transportation management system 1402 or through another provider computing device, such as provider computing device 1416. In some embodiments, a requestor computing device (e.g., device 1424) may communicate via a connection 1426 directly with transportation management vehicle device 1418 via a communication channel and/or connection, such as a peer-to-peer connection, Bluetooth connection, NFC connection, ad hoc wireless network, and/or any other communication channel or connection. Although FIG. 14 shows particular devices communicating with transportation management system 1402 over networks 1410 and 1412, in various embodiments, transportation management system 1402 may expose an interface, such as an application programming interface (API) or service provider interface (SPI) to enable various third parties which may serve as an intermediary between end users and transportation management system 1402.

In some embodiments, devices within a vehicle may be interconnected. For example, any combination of the following may be communicatively connected: vehicle 1414(*a*), vehicle 1414(*b*), vehicle 1414(*c*), provider computing device 1416, provider tablet 1420, transportation management vehicle device 1418, requestor computing device 1424, requestor tablet 1422, and any other device (e.g., smart watch, smart tags, etc.). For example, transportation management vehicle device 1418 may be communicatively connected to provider computing device 1416 and/or requestor computing device 1424. Transportation management vehicle device 1418 may establish communicative connections, such as connections 1426 and 1428, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1402 using applications executing on their respective computing devices (e.g., 1416, 1418, 1420, and/or a computing device integrated within vehicle 1414(*a*), vehicle 1414(*b*), and/or vehicle 1414(*c*)), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1414(*a*), vehicle 1414(*b*), and/or vehicle 1414(*c*) may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1402. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 15:
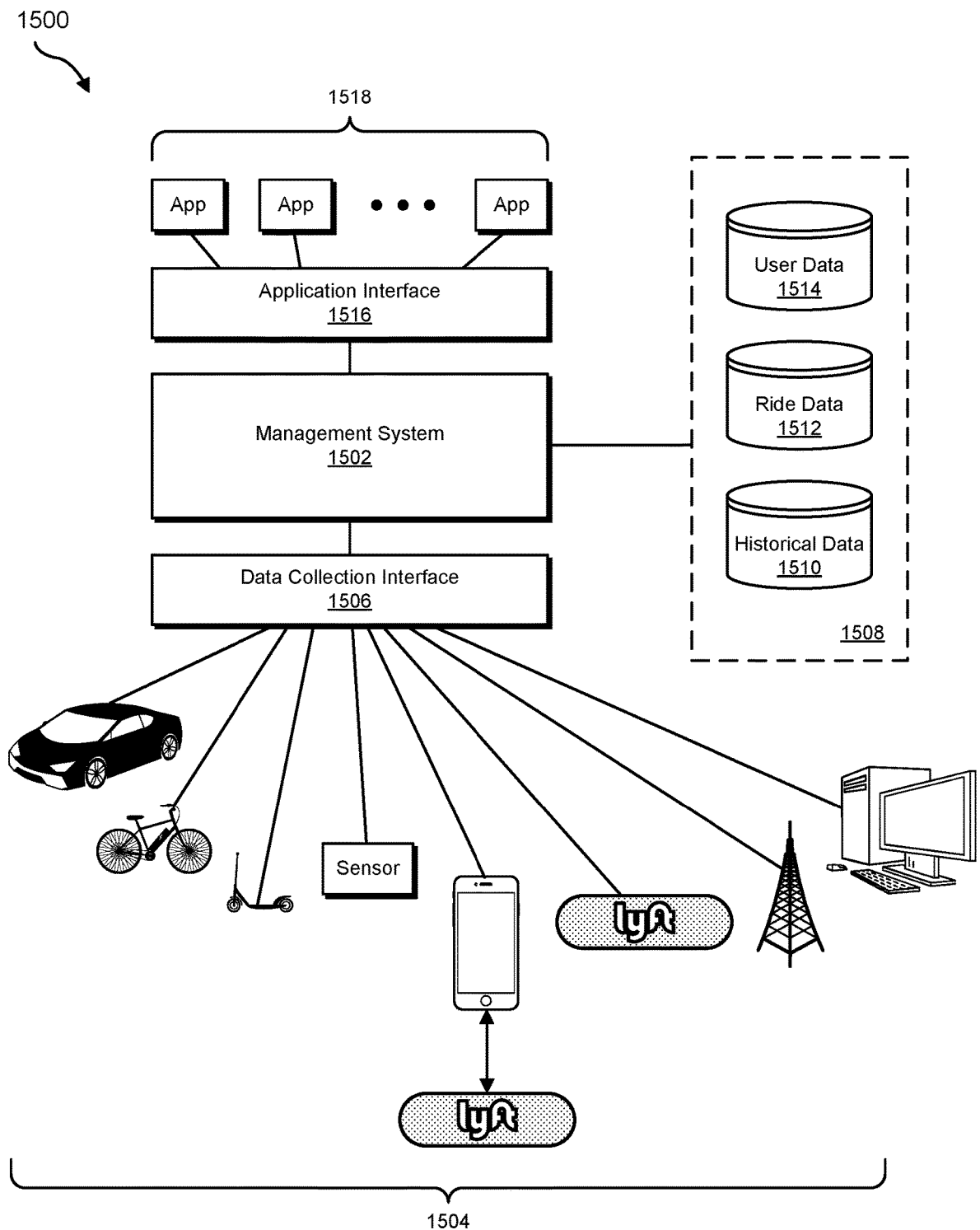
FIG. 15 shows a data collection and application management environment in accordance with various embodiments.

FIG. 15 shows a data collection and application management environment 1500, in accordance with various embodiments. As shown in FIG. 15, management system 1502 may be configured to collect data from various data collection devices 1504 through a data collection interface 1506. As discussed above, management system 1502 may include one or more computers and/or servers or any combination thereof. Data collection devices 1504 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1506 can include, e.g., an extensible device framework configured to support interfaces for each data collection device. In various embodiments, data collection interface 1506 may be extended to support new data collection devices as they are released and/or to update existing interfaces to support changes to existing data collection devices. In various embodiments, data collection devices may communicate with data collection interface 1506 over one or more networks. The networks may include any network or communication protocol as would be recognized by one of ordinary skill in the art, including those networks discussed above.

As shown in FIG. 15, data received from data collection devices 1504 can be stored in data store 1508. Data store 1508 may include one or more data stores, such as databases, object storage systems and services, cloud-based storage services, and other data stores. For example, various data stores may be implemented on a non-transitory storage medium accessible to management system 1502, such as historical data store 1510, ride data store 1512, and user data store 1514. Data stores 1508 can be local to management system 1502, or remote and accessible over a network, such as those networks discussed above or a storage-area network or other networked storage system. In various embodiments, historical data 1510 may include historical traffic data, weather data, request data, road condition data, or any other data for a given region or regions received from various data collection devices. Ride data 1512 may include route data, request data, timing data, and other ride related data, in aggregate and/or by requestor or provider. User data 1514 may include user account data, preferences, location history, and other user-specific data. Although certain data stores are shown by way of example, any data collected and/or stored according to the various embodiments described herein may be stored in data stores 1508.

As shown in FIG. 15, an application interface 1516 can be provided by management system 1502 to enable various apps 1518 to access data and/or services available through management system 1502. Apps 1518 may run on various user devices (including provider and requestor computing devices, such as those discussed above) and/or may include cloud-based or other distributed apps configured to run across various devices (e.g., computers, servers, or combinations thereof). Apps 1518 may include, e.g., aggregation and/or reporting apps which may utilize data 1508 to provide various services (e.g., third-party ride request and management apps). In various embodiments, application interface 1516 can include an API and/or SPI enabling third party development of apps 1518. In some embodiments, application interface 1516 may include a web interface, enabling web-based access to data 1508 and/or services provided by management system 1502. In various embodiments, apps 1518 may run on devices configured to communicate with application interface 1516 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a transportation request, may receive traffic data, construction data, personal mobility vehicle data, and lane-constrained vehicle of a provider data to be transformed, transform the traffic data, construction data, personal mobility vehicle data, lane-constrained vehicle of a provider data, output a result of the transformation to match a lane-constrained vehicle of a provider and one or more personal mobility vehicle(s) to complete a transportation request and/or a trip, use the result of the transformation to provide the match to a transportation requestor and provide the completion of the transportation request and/or the trip, and store the personal mobility vehicle data and the lane-constrained vehicle of a provider data. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   subsequent to receiving, by a dynamic transportation matching system, a transportation request for transporting a transportation requestor from a first location to a second location:
   identifying, by the dynamic transportation matching system, a lane-constrained vehicle capable of transporting the transportation requestor from the first location to the second location at a travel efficiency;
   identifying, by the dynamic transportation matching system, a personal mobility vehicle capable of transporting the transportation requestor based on a distance between a location of the personal mobility vehicle and either the first location or the second location;
   determining, by the dynamic transportation matching system, an intermediate location accessible by the personal mobility vehicle and the lane-constrained vehicle;
   determining, by the dynamic transportation matching system, that using a combination of the lane-constrained vehicle and the personal mobility vehicle to transport the transportation requestor from (i) the first location to the intermediate location or (ii) the intermediate location to the second location improves the travel efficiency; and
   matching, by the dynamic transportation matching system, the transportation requestor with the personal mobility vehicle and the lane-constrained vehicle, wherein the lane-constrained vehicle is instructed to transport the transportation requestor (i) from the first location to the intermediate location or (ii) from the intermediate location to the second location.

2. The method of claim 1, further comprising:
   providing, by the dynamic transportation matching system, the transportation requestor with instructions for navigating to the location of the personal mobility vehicle.

3. The method of claim 1, wherein the travel efficiency is based on one or more of a traffic density of a route capable of being used by the lane-constrained vehicle for traveling between the first location and the second location or a traffic condition of a route capable of being used by the lane-constrained vehicle.

4. The method of claim 1, wherein determining the intermediate location further comprises determining that a second distance between the location of the personal mobility vehicle and the intermediate location is travelable by the personal mobility vehicle.

5. The method of claim 1, wherein determining the intermediate location further comprises determining that a route between the location of the personal mobility vehicle and the intermediate location is travelable by the personal mobility vehicle.

6. The method of claim 1, wherein determining the intermediate location further comprises determining that rendezvousing of the transportation requestor with the lane-constrained vehicle is accomplishable at the intermediate location.

7. The method of claim 1, wherein the intermediate location further comprises a docking area for the personal mobility vehicle.

8. The method of claim 1, wherein determining the intermediate location is based on one or more of a distance of the lane-constrained vehicle from a starting location, a road condition of the first location or a road condition of the intermediate location.

9. The method of claim 1, further comprising:
predicting, by the dynamic transportation matching system, that there is lane-constrained vehicle traffic within a threshold distance to the first location or the second location; and
identifying, by the dynamic transportation matching system, the intermediate location away from the first location or the second location, the intermediate location being outside the lane-constrained vehicle traffic.

10. The method of claim 9, further comprising;
positioning a plurality of personal mobility vehicles, based on the predicting that there is lane-constrained vehicle traffic within the threshold distance to the first location or the second location, within the threshold distance away from the first location or the second location.

11. A system comprising:
one or more physical processors; and
one or more memories coupled to one or more of the physical processors, the one or more memories comprising instructions operable when executed by the one or more physical processors to cause the system to perform operations comprising:
subsequent to receiving a transportation request for transporting a transportation requestor from a first location to a second location:
identifying, a lane-constrained vehicle capable of transporting the transportation requestor from the first location to the second location at a travel efficiency;
identifying, a personal mobility vehicle capable of transporting the transportation requestor based on a distance between a location of the personal mobility vehicle and either the first location or the second location;
determining, an intermediate location accessible by the personal mobility vehicle and the lane-constrained vehicle;
determining, that using a combination of the lane-constrained vehicle and the personal mobility vehicle to transport the transportation requestor from (i) the first location to the intermediate location or (ii) the intermediate location to the second location improves the travel efficiency; and
matching, the transportation requestor with the personal mobility vehicle and the lane-constrained vehicle, wherein the lane-constrained vehicle is instructed to transport the transportation requestor (i) from the first location to the intermediate location or (ii) from the intermediate location to the second location.

12. The system of claim 11, further comprising:
providing, by the dynamic transportation matching system, the transportation requestor with instructions for navigating to the location of the personal mobility vehicle.

13. The system of claim 11, wherein the travel efficiency is based on one or more of a traffic density of a route capable of being used by the lane-constrained vehicle for traveling between the first location and the second location or a traffic condition of a route capable of being used by the lane-constrained vehicle.

14. The system of claim 11, wherein determining the intermediate location further comprises determining that a second distance between the location of the personal mobility vehicle and the intermediate location is travelable by the personal mobility vehicle.

15. The system of claim 11, wherein determining the intermediate location further comprises determining that a route between the location of the personal mobility vehicle and the intermediate location is travelable by the personal mobility vehicle.

16. The method of claim 11, wherein determining the intermediate location further comprises determining that rendezvousing of the transportation requestor with the lane-constrained vehicle is accomplishable at the intermediate location.

17. The method of claim 11, wherein the intermediate location further comprises a docking area for the personal mobility vehicle.

18. The method of claim 11, wherein determining the intermediate location is based on one or more of a distance of the lane-constrained vehicle from a starting location, a road condition of the first location or a road condition of the intermediate location.

19. The method of claim 11, further comprising:
predicting, by the dynamic transportation matching system, that there is lane-constrained vehicle traffic within a threshold distance to the first location or the second location;
identifying, by the dynamic transportation matching system, the intermediate location away from the first location or the second location, the intermediate location being outside the lane-constrained vehicle traffic; and
positioning a plurality of personal mobility vehicles, based on the predicting that there is lane-constrained vehicle traffic within the threshold distance to the first location or the second location, within the threshold distance away from the first location or the second location.

20. A computer-readable medium comprising computer-readable instructions that, when executed by at least one processor of a computing device, cause the computing device to:
subsequent to receiving, by a dynamic transportation matching system, a transportation request for transporting a transportation requestor from a first location to a second location:
identify, by the dynamic transportation matching system, a lane-constrained vehicle capable of transporting the transportation requestor from the first location to the second location at a travel efficiency;
identify, by the dynamic transportation matching system, a personal mobility vehicle capable of transporting the transportation requestor based on a distance between a location of the personal mobility vehicle and either the first location or the second location;
determine, by the dynamic transportation matching system, an intermediate location accessible by the personal mobility vehicle and the lane-constrained vehicle;
determine, by the dynamic transportation matching system, that using a combination of the lane-constrained vehicle and the personal mobility vehicle to transport the transportation requestor from (i) the first location to the intermediate location or (ii) the intermediate location to the second location improves the travel efficiency; and match, by the dynamic transportation matching system, the transportation requestor with the personal mobility vehicle and the lane-constrained vehicle, wherein the lane-constrained vehicle is instructed to transport the transportation requestor (i) from the first location to the intermediate location or (ii) from the intermediate location to the second location.

* * * * *